(12) United States Patent
Chapweske et al.

(10) Patent No.: US 8,301,732 B2
(45) Date of Patent: *Oct. 30, 2012

(54) LIVE MEDIA DELIVERY OVER A PACKET-BASED COMPUTER NETWORK

(75) Inventors: Justin F. Chapweske, Fridley, MN (US); Ryan Brase, Minneapolis, MN (US); Nicholas A. Wormley, St. Paul, MN (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,018

(22) Filed: Jul. 8, 2011

(65) Prior Publication Data

US 2011/0264771 A1 Oct. 27, 2011

Related U.S. Application Data

(63) Continuation of application No. 12/463,971, filed on May 11, 2009, now Pat. No. 7,979,570.

(60) Provisional application No. 61/052,459, filed on May 12, 2008, provisional application No. 61/073,542, filed on Jun. 18, 2008.

(51) Int. Cl.
 *G06F 15/16* (2006.01)
(52) U.S. Cl. .................... 709/219; 709/203; 713/177
(58) Field of Classification Search .............. 709/219, 709/203; 713/177
See application file for complete search history.

(56) References Cited

U.S. PATENT DOCUMENTS

| 4,881,264 | A | * | 11/1989 | Merkle ........................ 713/177 |
| 6,141,659 | A | * | 10/2000 | Barker et al. ........................ 1/1 |
| 6,195,680 | B1 | * | 2/2001 | Goldszmidt et al. .......... 709/203 |
| 6,339,785 | B1 | | 1/2002 | Feigenbaum |
| 6,477,522 | B1 | | 11/2002 | Young |
| 6,601,136 | B2 | | 7/2003 | Gunaseelan et al. |
| 6,742,023 | B1 | | 5/2004 | Fanning et al. |
| 6,771,674 | B1 | | 8/2004 | Schuster et al. |
| 6,772,337 | B1 | | 8/2004 | Yener |
| 7,047,309 | B2 | | 5/2006 | Baumann et al. |
| 7,058,721 | B1 | | 6/2006 | Ellison et al. |
| 7,133,368 | B2 | | 11/2006 | Zhang et al. |

(Continued)

FOREIGN PATENT DOCUMENTS

EP 1 298 931 A2 4/2003

(Continued)

OTHER PUBLICATIONS

Response to Office Action dated May 16, 2011, from U.S. Appl. No. 12/252,782, filed Aug. 16, 2011, 20 pp.

(Continued)

*Primary Examiner* — Tammy Nguyen
(74) *Attorney, Agent, or Firm* — Turocy & Watson, LLP

(57) ABSTRACT

In general, this disclosure describes techniques of determining a backset for client devices attempting to download data of a live transmission. A backset is an amount of temporal delay that the client devices are delayed by when viewing the live transmission. As described herein, a media content provider may determine a recommended backset for each client devices based characteristics of the client device. Each client device may then be backset by the determined value, or may calculate its own backset based on the recommended backset. Establishing a backset for each client device may avoid rebuffering of live transmission data.

25 Claims, 15 Drawing Sheets

U.S. PATENT DOCUMENTS

| | | |
|---|---|---|
| 7,251,691 B2 | 7/2007 | Boyd et al. |
| 7,277,950 B1 | 10/2007 | Chapweske |
| 7,555,559 B2 | 6/2009 | Chapweske |
| 7,831,718 B2 | 11/2010 | Chapweske |
| 7,979,570 B2 | 7/2011 | Chapweske et al. |
| 2001/0051996 A1 | 12/2001 | Cooper et al. |
| 2002/0002708 A1 | 1/2002 | Arye |
| 2002/0003541 A1 | 1/2002 | Boyd et al. |
| 2002/0042924 A1 | 4/2002 | Adams |
| 2002/0049760 A1 | 4/2002 | Scott et al. |
| 2002/0049846 A1 | 4/2002 | Horen et al. |
| 2002/0065922 A1 | 5/2002 | Shastri |
| 2002/0108112 A1 | 8/2002 | Wallace et al. |
| 2002/0133247 A1 | 9/2002 | Smith et al. |
| 2002/0138443 A1 | 9/2002 | Schran et al. |
| 2004/0064573 A1 | 4/2004 | Leaning et al. |
| 2004/0078470 A1 | 4/2004 | Baumeister et al. |
| 2004/0111526 A1 | 6/2004 | Baldwin et al. |
| 2004/0193900 A1 | 9/2004 | Nair |
| 2004/0205093 A1 | 10/2004 | Li et al. |
| 2005/0010792 A1 | 1/2005 | Carpentier et al. |
| 2005/0021575 A1 | 1/2005 | Boyd et al. |
| 2005/0102371 A1 | 5/2005 | Aksu |
| 2005/0183120 A1 | 8/2005 | Jain et al. |
| 2006/0026161 A1 | 2/2006 | Henseler |
| 2006/0235883 A1 | 10/2006 | Krebs |
| 2007/0078876 A1 | 4/2007 | Hayashi et al. |
| 2007/0088844 A1 | 4/2007 | Seims |
| 2007/0157267 A1 | 7/2007 | Lopez-Estrada |
| 2007/0261072 A1 | 11/2007 | Boulet et al. |
| 2008/0040497 A1 | 2/2008 | Venkatramani et al. |
| 2008/0046917 A1 | 2/2008 | de Heer |
| 2008/0050096 A1 | 2/2008 | Ryu |
| 2008/0104121 A1 | 5/2008 | Gottlieb et al. |
| 2008/0141317 A1 | 6/2008 | Radloff et al. |
| 2008/0201416 A1 | 8/2008 | Lipton |
| 2009/0106356 A1 | 4/2009 | Brase et al. |
| 2009/0150557 A1 | 6/2009 | Wormley et al. |
| 2009/0185619 A1 | 7/2009 | Taleb et al. |
| 2009/0327512 A1 | 12/2009 | Chapweske |
| 2010/0023579 A1 | 1/2010 | Chapweske et al. |
| 2010/0146145 A1 | 6/2010 | Tippin et al. |
| 2010/0191656 A1 | 7/2010 | Martin et al. |

FOREIGN PATENT DOCUMENTS

| | | |
|---|---|---|
| EP | 1 638 333 A1 | 3/2006 |
| GB | 2 395 387 A | 5/2004 |
| WO | 0139002 A1 | 5/2001 |
| WO | 0191417 A2 | 11/2001 |
| WO | 2007/063430 A2 | 6/2007 |
| WO | 2009/075766 A3 | 6/2009 |

OTHER PUBLICATIONS

Kaminsky, D., "Vectorcast: A Proposal Regarding the efficient Distribution of Data on High Bandwidth Networks," Jan. 12, 1998, 4 pages.

Francis, P., "Yallcast: Extending the Internet Multicast Architecture," Sep. 30, 1999, pp. 1-39.

Byers, J. et al., "Accessing Multiple Mirror Sites in Parallel: Using Tornado Codes to Speed Up Downloads," Apr. 1999, pp. 275-283.

Dessent, Brian, "Brian's BitTorrent FAQ and Guide", May 10, 2003, accessed from http://www.dessent.net/btfaq, 40 pgs.

Koman, Richard, "The Swarmcast Solution", May 24, 2001, accessed from http://open2p.com/lpt/a/883, 4 pgs.

Padmanabhan et al., "Distributing Streaming Media Content Using Cooperative Networking", Proceedings of the 12th International Workshop on Network and Operating Systems Support for Digital Audio: NOSSDAV, May 12-14, 2002, pp. 177-186.

Byers et al., "A Digital Fountain Approach to Reliable Distribution of Bulk Data", Proc. ACM SIGCOMM, ACM Press, New York, 1998, pp. 56-67.

V.K. Goyal, "Multiple Description Coding: Compression Meets the Network", IEEE Signal Processing Magazine, vol. 18, 2001, pp. 74-93.

Chu et al., "A Case for End System Multicast", Proceedings ACM SIGMETRICS 2000: International Conference on Measurement and Modeling of Computer Systems, Jun. 17-21, 2001, pp. 1-12.

Rejaie et al., "Architectural Considerations for Playback of Quality Adaptive Video Over the Internet", Proceedings IEEE International Conference on Networks, Sep. 2000, (pp. 204-209).

Wang, "Traffic Regulation under the Percentile-Based Pricing Policy", Proceedings of the First International Conference on Scalable Information Systems, Jun. 2006, (8 pages).

Duffield et al., "Issues of Quality and Multiplexing When Smoothing Rate Adaptive Video", IEEE Transactions on Multimedia, vol. 1, No. 4, Dec. 1999, (13 pgs.).

Gürses et al., "A Simple and Effective Mechanism for Stored Video Streaming with TCP Transport and Server-Side Adaptive Frame Discard", Computer Networks, 48, Dec. 30, 2004, (pp. 489-501).

Birney, "Intelligent Streaming", Inside Windows Media, Nov. 19, 1999, XP-002177089, (9 pgs.).

"Video Compression Picture Types", from Wikipedia, the free encyclopedia, http://en.wikipedia.org/w/index.php?title=Video_picture_types&oldid=252563025, XP-002571418, printed Mar. 4, 2010, 5 pages.

Carter et al., "Dynamic Server Selection using Bandwidth Probing in Wide-Area Networks," Computer Science Department, Boston University, Mar. 18, 1996, 20 pp.

Suh et al., "Push-to-Peer Video-on-Demand system: design and evaluation," Thomson Technical Report, Nov. 29, 2006, 15 pp.

Rodriguez et al., "Parallel-Access for Mirror Sites in the Internet," Institut EURECOM, Mar. 26, 2000, 864-873 pp.

Notification of Transmittal of the International Search Report and the Written Opinion of the International Searching Authority, or the Declaration from corresponding PCT Application No. PCT/US2009/043484, mailed Nov. 23, 2009, (11 pages).

Notification Concerning Transmittal of International Preliminary Report on Patentability (Chapter I of the Patent Cooperation Treaty) for corresponding patent application No. PCT/US2009/043484, mailed Nov. 25, 2010, 7 pages.

Notice of Allowance from U.S. Appl. No. 12/463,971, mailed Mar. 17, 2011, 23 pp.

Office Action from U.S. Appl. No. 12/252,782, dated Nov. 29, 2010, 13 pp.

Response to Office Action dated Nov. 29, 2010, from U.S. Appl. No. 12/252,782, filed Feb. 28, 2011, 18 pp.

Office Action from U.S. Appl. No. 12/252,782, dated May 16, 2011, 13 pp.

Response to Office Action dated Jun. 16, 2011, from U.S. Appl. No. 12/252,782, filed Aug. 16, 2011, 20 pp.

Office Action from U.S. Appl. No. 12/486,589, dated May 31, 2011, 12 pp.

Response to Office Action dated May 31, 2011, from U.S. Appl. No. 12/486,589, filed Aug. 31, 2011, 19 pp.

Office Action from U.S. Appl. No. 12/328,139, dated Sep. 20, 2010, 12 pp.

Response to Office Action dated Sep. 20, 2010, from U.S. Appl. No. 12/328,139, dated Dec. 16, 2010, 19 pp.

Office Action from U.S. Appl. No. 12/328,139, dated Feb. 9, 2011, 14 pp.

Response to Office Action dated Feb. 9, 2011, from U.S. Appl. No. 12/328,139, filed Apr. 11, 2011, 10 pp.

Advisory Action from U.S. Appl. No. 12/328,139, dated May 5, 2011, 3 pp.

Responsive Amendment after Final Office Action dated Feb. 9, 2011, and Advisory Action dated May 5, 2011, for U.S. Appl. No. 12/328,139, filed May 9, 2011, 20 pp.

* cited by examiner

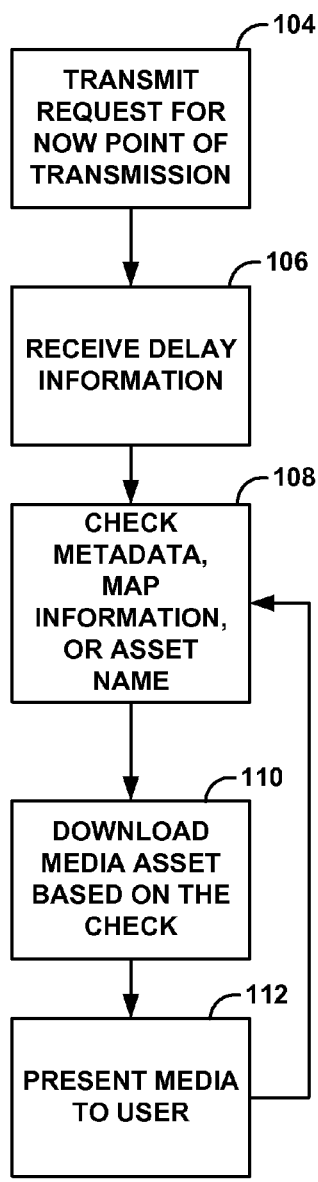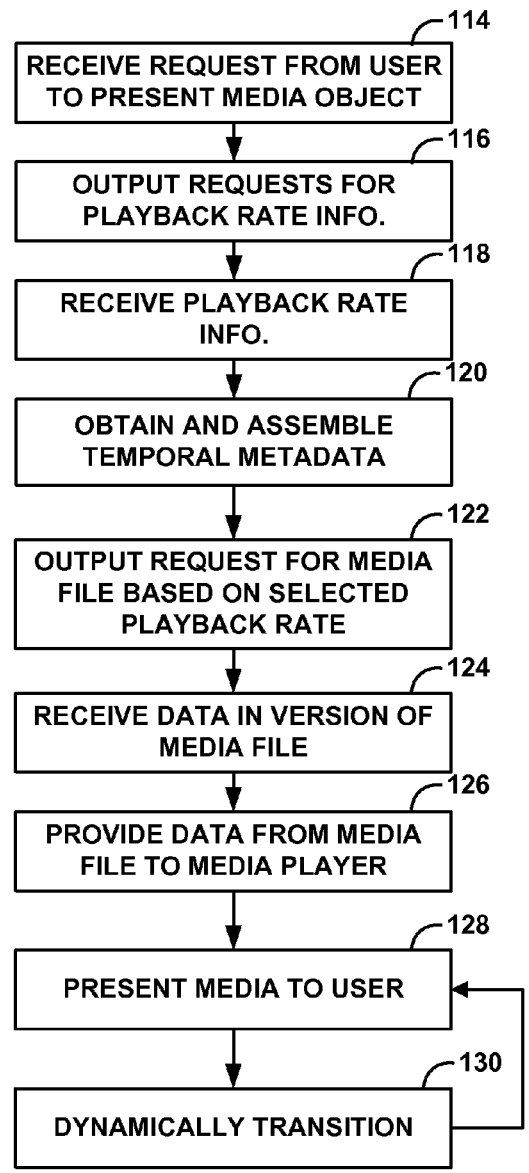
FIG. 10A
FIG. 10B

LIVE MEDIA DELIVERY OVER A PACKET-BASED COMPUTER NETWORK

This application is a Continuation of U.S. application Ser. No. 12/463,971 filed May 11, 2009, U.S. Pat. No. 7,979,570 which claims priority from U.S. Provisional Application Ser. No. 61/052,459 filed May 12, 2008, and from U.S. Provisional Application Ser. No. 61/073,542 filed Jun. 18, 2008, the entire contents of each are incorporated herein by reference.

TECHNICAL FIELD

The invention relates to computer networks and particularly to downloading media data on computer networks.

BACKGROUND

Media content providers are increasingly using the Internet for transmitting media content to consumers of the content. YouTube is one example of a website used by media content providers to distribute media content. Media content providers are also starting to provide "live" transmission of various events over the Internet, so that a user can view the event on a computer or cell phone. Sporting events and concerts are examples of events which have been transmitted live via the Internet.

Individuals downloading such live transmissions often experience long buffering delays or transmission glitches due to bandwidth limitations of their network connection. These delays or glitches potentially degrade the viewing experience to a point where the live transmission may be unwatchable.

Conventionally, the media content provider streams the live transmission to a client device. The client device buffers some amount of the data before displaying the contents of the live transmission. A media player or other software running on the client device determines the amount of live transmission that is buffered before displaying the contents of the live transmission. In this manner, during situations when the network bandwidth is less than ideal, the client device has buffered data that can be presented to the user.

However, the traditional solutions pose several problems. For example, significant delays in transmission may cause the media player to process and present all of the buffered data to the user, requiring the client device to again wait for more data to be buffered before being able to present the content to the user. Furthermore, transmission glitches (e.g., packet loss within the intermediate network) may result in parts of the media content not being received, or being unretreivable, by the client device, and therefore not presented to the user.

SUMMARY

In general, the invention provides improved techniques for delivering packetized data of a live transmission over a network to a client device. The techniques may reduce rebuffering delays that otherwise commonly occur when a client device displays all the contents that were previously buffered in the client device causing the client device to stop displaying the live transmission while it buffers more data of the live transmission.

To reduce rebuffering delays, as one example, a server processes a digital data stream of the live transmission and produces discrete media assets representing individual subsections of the media that are explicitly addressable by client devices without requiring the whole of the digital media stream exist on the sending side before starting the delivery of the media assets to the client devices. Each of the discrete media assets represents packetized data for a different portion of the live transmission.

Moreover, in response to request to download or otherwise join the viewing of the live transmission, the server, provides to the requesting client one or more discrete media assets corresponding to portions of the live transmission that are earlier in time (i.e., "temporally prior") to the point in time at which the client initiated the request. In this manner, the server backsets the client device by initiating the client's viewing experience at an earlier point in time within the live transmission. As a result, the media assets received and displayed by the client device are temporally prior (i.e., back in time) relative to the actual point in time of the live event. This allows the client device to buffer data of the live transmission such that when the actual throughput rate is not ideal, the client device has already downloaded some portion of one or more of the media assets of a live transmission so that the client device can seamlessly continue to present the live transmission to the user without glitches. Additionally, as described herein, client devices can download the digital media assets faster than real-time with respect to the live transmission, which can be used to alleviate data shortages resulting from any prior data reception difficulties by the client device.

The server may determine the backset for a particular client device based on characteristics of the network and/or the particular client device. For example, the server may determine the backset based on a number of users currently downloading the live transmission, an actual throughput rate, and a historical throughput rate, to name a few characteristics.

Each discrete media asset may be considered and accessed as a separate media asset, which is a network addressable logical construct. For example, each media asset may be a logical construct represented as a separate file stored at the media server or as a separately addressable construct stored within a memory of the media server. Each discrete media asset is individually storeable, addressable, and downloadable, based on a predictable naming scheme, by the client device.

To further reduce rebuffering delays, the client device may download media assets or portions of the same media asset from multiple sources (i.e., one or more other client devices and/or the server) in parallel. The technique of downloading media assets in parallel is referred to herein as swarming. This allows the client device to more quickly buffer data of the live transmission.

In one embodiment the invention is directed to a method for a media server to deliver a live transmission. The method comprises receiving a request from a plurality of client devices to download the live transmission via a packet-based computer-network and determining an amount of backset for each one of the plurality of client devices upon receiving the request, wherein at least two client devices of the plurality of client devices are determined to have different amounts of backset. The method further comprises providing the plurality of client devices at least one media asset stored by the media server based on the determined amount of backset, wherein the at least one media asset comprises data of the live transmission for a time interval or data range.

In another embodiment the invention is directed to a method for a client device to receive a live transmission. The method comprises transmitting a request to a media server to download the live transmission and receiving a backset from the media server. The method further comprises requesting a media asset of the live transmission based on the received backset, wherein the media asset comprises data of the live transmission for a time interval or data range. The method further comprises downloading the media asset.

In another embodiment the invention is directed to a media content provider to deliver a live transmission. The media content provider comprises an encapsulator that includes an interface to receive the live transmission and provide the live transmission to a media asset builder that generates a plurality of media assets. The media content provider also comprises a media server that stores each one of the plurality of media assets, provides the media assets to a plurality of client devices, and determines an amount of backset for each one of the plurality of client devices, wherein at least two client devices of the plurality of client devices have different amounts of backset.

In another embodiment the invention is directed to a client device to receive a live transmission. The client device comprises a media player and a download agent comprising a playback controller, a source agent, a backset calculator, and a stream agent. The source agent transmits a request to a media server to download the live transmission, and receives a backset from the media server. The source agent requests a media asset based on the received backset and causes the stream agent to the download the requested media asset. The media asset comprises data of the live transmission for a time interval or data range.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 10A-10B is a flowchart illustrating an example operation of the download agent.

DETAILED DESCRIPTION

Figure 1A:
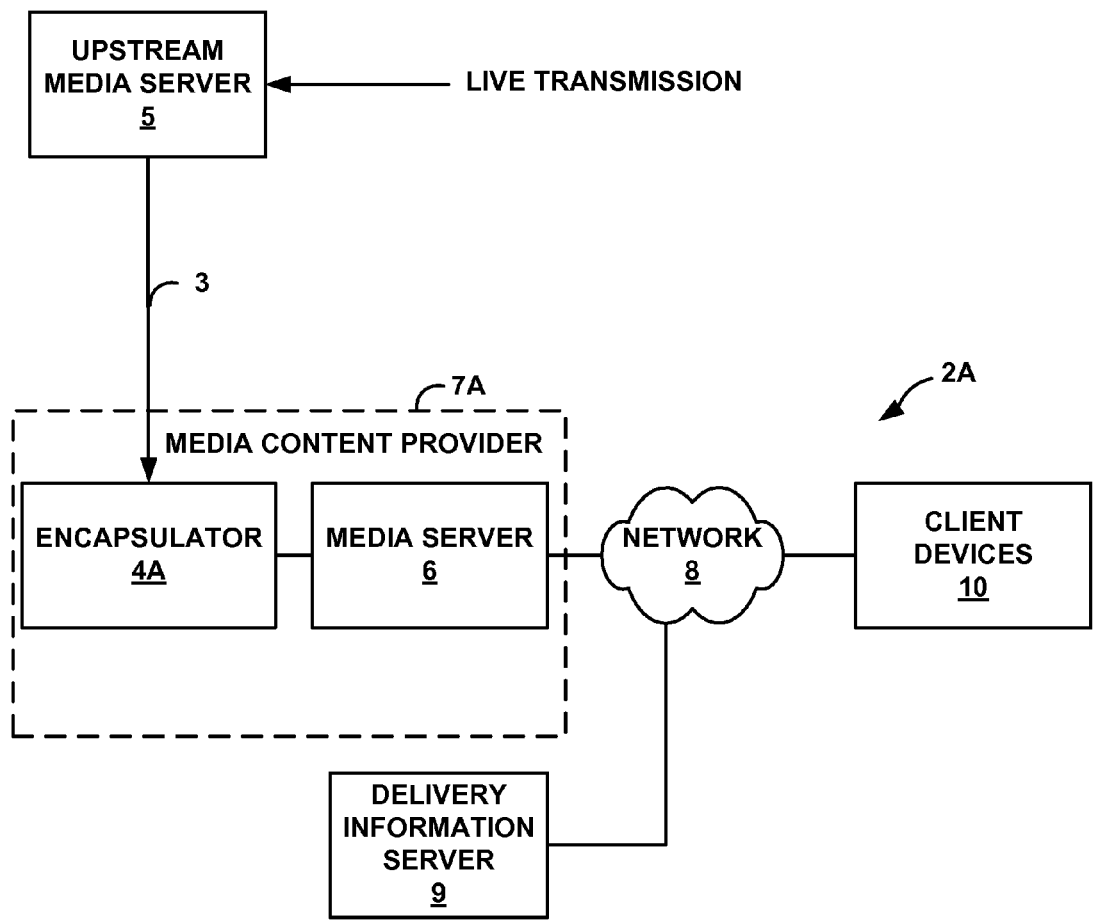
FIGS. 1A and 1B are block diagrams illustrating an exemplary system for transmitting and receiving packet based stream carrying live transmission.

FIG. 1A is a block diagram illustrating an exemplary system 2A for downloading a live transmission of an event. System 2A includes upstream media server 5, media content provider 7A, network 8, delivery information server 9, and client devices 10. In some embodiments, upstream media server 5 receives raw (i.e., unencoded) video and audio data of the live transmission. In this case, upstream media server 5 may be geographically proximate to the event that is being transmitted live. Upstream media server 5 may encode the live transmission and generate a packetized stream 3. Upstream media server 5 may encode the live transmission using various techniques well known in the art. For example, the packetized stream may be a plurality of frames. The frames may be intra (I) frames, predictive (P) frames, or bi-directional (B) frames. I frames are frames that are encoded without reference to any other frames and may provide an entirely encoded picture. P frames and B frames are encoded based on at least one other frame and generally contain image data and motion vector displacements that are relative to a previous key frame in the stream.

In the embodiment shown in FIG. 1A, media content provider (MCP) 7A operates as a client to upstream media server 5 so as to receive the packetized stream 3 of the live transmission from the upstream media server. However, unlike conventional clients, which display the received media, MCP 7A process the digital data stream to produce discrete media assets representing individual subsections of the media that are explicitly addressable by client devices 10 without requiring the whole of the digital media stream for the live transmission exist at MCP 7A before starting the delivery of the media assets to the client devices 10. Each of the discrete media assets represents packetized data corresponding to a different portion (i.e., different segment in time) of the live transmission. MCP 7A may be an enterprise or other organization that provides media content to client devices. For example, MCP 7A may be a corporation that runs a web site that allows users to view live events.

As shown in FIG. 1A, MCP 7 includes encapsulator 4A and media server 6. In some embodiments, encapsulator 4A may be geographically proximate to upstream media server 5. There may be a large geographical distance between encapsulator 4A and media server 6, i.e. media server 6 may be downstream from upstream media server 5 and encapsulator 4A.

Encapsulator 4A may present itself as a media player to upstream media server 5 and output a request to upstream media server 5 for the packet based stream. In response, encapsulator 4A may receive the packet based stream from upstream media server 5. Encapsulator 4A may receive the packet based stream as a complete or growing file on a disk. Encapsulator 4A may request the packet based stream from upstream media server 5 by referencing upstream media server's 5 Uniform Resource Locator (URL). Encapsulator 4A may download the data from upstream media server 5 using traditional digital media transport mechanisms such as real time streaming protocol (RTSP).

Encapsulator 4A processes the packetized data stream by dividing the data stream into a plurality of media assets. As used in this disclosure, a "media asset" is a container of media data (e.g., a distinct media file) that a client device 10 can individually address for download and play back. Each discrete media asset may be considered and accessed as a separate media asset, which is a network addressable logical construct. For example, each media asset may be a logical construct represented as a separate file stored at media server 6 or as a separately addressable construct stored within a memory of media server 6. Each media asset may be considered to be an independent media file. Each media asset may contain data for a certain amount of time of the live transmission, for example each media asset may contain data for 2 minutes of live transmission data. In another embodiment, each media asset may have a fixed data size, for example 5 mega-bytes, of data for a live transmission.

To generate a media asset, encapsulator 4A may define the first frame of the received packetized video data stream as a key frame. Generally, the first frame of the packetized video data will be an I frame, however this may not be necessary. Encapsulator 4A may populate the media asset with subsequent frames until the size of the media asset is approximately, as one example, 5 mega-bytes. 5 mega-bytes is merely one example, the size of each media asset may be different in different embodiments. The last few frames of a media asset may comprise a series of I frames. Additionally, encapsulator 4A may define various frames within the media asset as key frames. The last frame stored within the media asset may also be a key frame. To generate subsequent media assets, encapsulator 4A may take the frame following the last frame stored in the previous media asset and assign it as a key frame. Encapsulator 4A may populate the subsequent media asset with frames of the received packetized video data stream. As before, various frames within the media asset may be defined as key frames, the last few frames may be I frames, and the last frame stored may also be a key frame.

In this manner, each media asset may behave as an independent media file. Each media asset may be individually storeable, addressable, and downloadable. To access and download the media assets, each media asset may be given a predictable name. In one embodiment, each media asset may be named by using a designation and sequential integers for successive media assets. For example, data range of 0-5 MB of live transmission data may be called mediafile1, 5 MB-10 MB of live transmission data may be called mediafile2, and so on. In another embodiment, the media assets may be named by a combination of a predictable sequence with one or more shared secrets. For example, each media asset may have an encoded name with a particular key needed to predict the name.

In addition to generating a plurality of media assets, in some embodiments, encapsulator 4A may additionally generate multiple sets of plurality of media assets. Each set of plurality of media assets may contain similar data; however, the visual playback specification may be different for each media asset. The visual playback specification may be the playback rate of the media asset or the playback resolution of the media asset, to name a few examples of visual playback specification. The playback rate of the media asset is the number of bits per second that a client device needs to display to properly render the media asset. For example, encapsulator 4A may generate a first set of media assets with a certain playback resolution designed to be played back at a certain playback rate. Encapsulator 4A may generate a second set of media assets with a lower playback resolution than the first set of media assets designed to be played back at a lower playback rate than the first set of media assets. Encapsulator 4A may also generate a third set of media assets with a higher playback resolution than the first set of media assets designed to be played back at a higher playback rate than the first set of media assets.

In some embodiments, encapsulator 4A also generates a map of datastamps for all the media assets. In some embodiments, encapsulator 4A may provide a datastamp for each key frame within a media asset that corresponds to the amount of data received by encapsulator 4A up to the key frame. In some embodiments, the map may be a part of the media asset stored as metadata. Metadata will be described in more detail below with respect to FIGS. 2A and 2B.

In some embodiments, encapsulator 4A may have an internal cache memory to store a plurality of the generated media assets. In such embodiments, media server 6 may receive a request for a particular media asset from client device 10. Media server 6 queries encapsulator 4A for the particular media asset. Encapsulator 4A provides the media asset and the map of datastamps for the particular media asset to media server 6. Media server 6, in response to receiving the media asset and map of datastamps, provides the media asset and optionally a map of datastamps to client device 10. In some embodiments, encapsulator 4A may output the media assets and map of datastamps to media server 6. Media server 6 may store the media assets and map of datastamps. In such embodiments, media server 6 provides the media asset and map of datastamps to a requesting client device 10 without the aide of encapsulator 4A.

The remaining blocks shown in FIG. 1A will be described in detail following the disclosure of the system shown in FIG. 1B. Particularly, network 8, delivery information server 9, and client device 10 perform substantially similar functions for the systems shown in FIGS. 1A and 1B. Additionally, it is important to note that this disclosure describes techniques of the invention with respect to video data. For example, video data is described in FIG. 1A. However, the invention is not limited to only video data. Aspects of the invention may be applicable to audio data as well. For clarity and ease of description, this disclosure focuses on video data. One skilled in the art would realize that similar aspects may be applied to audio data as well.

Figure 1B:
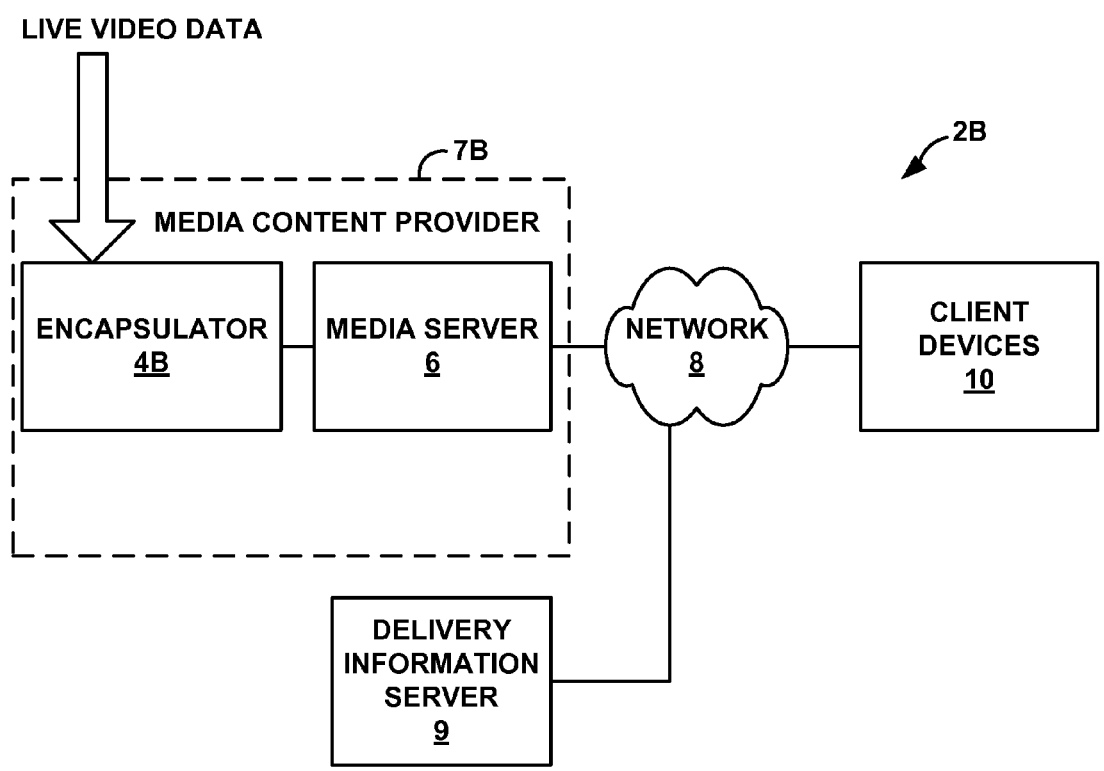

FIG. 1B is a block diagram illustrating a second embodiment including an exemplary system 2B for downloading a live transmission of an event. System 2B includes media content provider 7B, network 8, delivery information server 9, and client device 10. Media content provider (MCP) 7B may be an enterprise or other organization that provides media content to client devices. For example, MCP 7B may be a corporation that runs a web site that allows users to view live events. MCP 7B includes encapsulator 4B and media server 6.

In the embodiment of FIG. 1B, encapsulator 4B receives raw (unencoded) video transmission of a live event similar to upstream media server 5 (FIG. 1A). Encapsulator 4B may be geographically proximate to the live event. Alternatively, encapsulator 4B may be geographically distant from the live event. Upon receiving raw video transmission, encapsulator 4B generates an encoded packetized data stream. For example, encapsulator 4B may generate the encoded packetized data stream by generating a plurality of frames such as I frames, P frames, or B frames, similar to upstream media server 5 (FIG. 1A).

Similar to encapsulator 4A (FIG. 1A), after packetizing the raw video transmission, encapsulator 4B processes the packetized data stream by dividing the data stream into a plurality of media assets. As described with respect to FIG. 1A, each discrete media asset may be considered and accessed as a separate media asset, which is a network addressable logical construct. For example, each media asset may be a logical construct represented as a separate file stored at media server 6 or as a separately addressable construct stored within a memory of media server 6.

Similar to the description with respect to FIG. 1A, to generate a media asset, encapsulator 4B may define the first frame of the packetized video data stream as a key frame. Generally, the first frame of the packetized video data will be an I frame. In some embodiments, encapsulator 4B may populate the media asset with subsequent frames until the size of the media asset is approximately, as one example, 5 megabytes. 5 mega-bytes is merely one example, the size of each media asset may be different in different embodiments. In some embodiments, encapsulator 4B may populate the media asset with subsequent frames until the media asset consists of data for a particular time range. For example, encapsulator 4B may populate a media asset until the media asset consists of 40 seconds of live transmission. 40 seconds of live transmission is merely one example, the length of the time interval may be different in different embodiments. The last few frames of a media asset may comprise a series of I frames. Additionally, encapsulator 4B may define various frames within the media asset as key frames, similar to encapsulator 4A (FIG. 1A). The last frame stored within the media asset may also be a key frame. To generate subsequent media assets, encapsulator 4B may take the frame following the last frame stored in the previous media asset and assign it as a key frame. Encapsulator 4B may populate the subsequent media asset with frames of the received packetized video data stream. As before, various frames within the media asset may be defined as key frames, the last few frames may be I frames, and the last frame stored may also be a key frame.

In this manner, each media asset may behave as an independent media file. Each media asset may be individually storeable, addressable, and downloadable. To access and download the media assets, each media asset may be given a predictable name. In one embodiment, each media asset may be named by using a designation and sequential integers for successive media assets. For example, time interval of 0 seconds to 40 seconds of live transmission data may be called mediafile1, 40 seconds to 80 seconds of live transmission data may be called mediafile2, and so on. In another embodiment, the media assets may be named by a combination of a predictable sequence with one or more shared secrets. For example, each media asset may have an encoded name with a particular key needed to predict the name.

In addition to generating a plurality of media assets, in some embodiments, encapsulator 4B may additionally generate multiple sets of plurality of media assets similar to encapsulator 4A (FIG. 1A). Each set of plurality of media assets may contain similar data; however, the visual playback specification may be different for each media asset. The visual playback specification may be the playback rate at which the media assets are played back, the playback resolution of the media assets, the encoding scheme used to generate the media assets, to name a few examples of visual playback specification.

In addition to generating media assets, in some embodiments, encapsulator 4B may also generate a map of datastamps for all the media assets, similar to encapsulator 4A (FIG. 1A). In some embodiments, encapsulator 4B generates a map of timestamps for all the media assets. Encapsulator 4B may provide a timestamp for each key frame within a media asset that corresponds to the length of time of data received by encapsulator 4B up to the key frame. The map of timestamps may be a part of the media asset stored in as metadata. Metadata will be described in more detail below with respect to FIGS. 2A and 2B.

Encapsulator 4B may output the media assets and map of datastamps and/or map of timestamps to media server 6. In the embodiment shown in FIG. 1B, media server 6 stores all the media assets and the map of datastamps and/or map of timestamps.

The following description relates to media server 6, network 8, delivery information server 9, and client device 10. The description is applicable to systems 2A and 2B shown in FIGS. 1A and 1B respectively.

Media server 6 is capable of providing the media assets to a client device 10 in a sequential manner. Example media assets include video clips, audio clips, movies, live audio streams, live video streams, teleconference streams, telephone streams, digital cinema feeds, and other types of media. In the context of system 2A, media server 6 may, for example, be capable of providing the media assets where each media asset contains information for a data range. In the context of system 2B, media server 6 may, for example, be capable of providing the media assets where each media asset contains information for a data range or a time interval. In some embodiments, media server 6 is also capable of providing different sets of plurality of media assets with different visual playback specifications.

Additionally, media server 6 may determine how much each client device requesting to download the live transmission will be backset in viewing the live transmission. The term backset refers to a duration of a time interval that is prior to the current time of the live transmission, i.e., in the past. For example, a user may wish to view a concert, and media server 6 may determine that a user needs to be backset by 5 seconds. This means the user is actually viewing what happened in the concert 5 seconds ago. In this way, the user is viewing media associated with a time that is prior to the current time of the live transmission. Media server 6 may determine that different users are to be assigned different backsets, where those different backsets correspond to different media assets, and therefore different segments of time, for the live transmission. For example, media server 6 may assign the backset for a first user to be 5 seconds, and assign the backset for a second user to be 10 seconds.

Media server 6 determines the backset based on various characteristics, including characteristics associated with client devices 10 requesting to download the live transmission. For example, media server 6 may determine the backset for a client based on, for example, a number of client devices currently downloading the live transmission, a geographical proximity of client devices currently downloading the live transmission, an actual throughput rate to each one of the plurality of client devices, and a historical actual throughput rate to each one of the plurality of client devices, to name a few possible factors.

As illustrated in the example of FIGS. 1A and 1B, system 2A and 2B includes a network 8 that facilitates communication between client device 10 and media server 6. Network 8 may be a wide variety of different types of networks. For example, network 8 may be the Internet, a content-delivery network, a wide-area network, a wireless network, or another type of network. MCP 7A and MCP 7B may purchase rights to communicate on network 8 from a network service provider. The network service provider may be an Internet Service Provider (ISP) or a similar organization.

Delivery information server 9 is described in more detail below with respect to FIG. 8. Generally, delivery information server 9 may be configured to implement a data transfer policy established by MCP 7A or MCP 7B. The data transfer policy may indicate a desired overall bandwidth utilization. The desired overall bandwidth utilization is the amount of bandwidth that MCP 7A or MCP 7B wants to utilize at a given point in time. For example, a data transfer policy may indicate that MCP 7A or MCP 7B wants to maintain an overall bandwidth utilization of 100 megabytes/second. A data transfer policy may indicate that MCP 7A or MCP 7B want to maintain different bandwidth utilization at different times. For instance, a data transfer policy may indicate that MCP 7A or MCP 7B wants to utilize 100 megabytes/second of bandwidth between the hours of 5:00 AM and 9:00 PM and utilize 90 megabytes/second of bandwidth between the hours of 9:00 PM through 4:59 AM. Additionally, while systems 1A and 1B include delivery information server 9, delivery information server 9 may not be necessary for all embodiments.

Client device 10 may be any type of device capable of playing video data viewable by an end user. Client device 10 may be a wide variety of different types of devices. For example, client device 10 may be a personal computer, a laptop computer, a mobile telephone, a personal media player, a device integrated into a vehicle, a network telephone, a network television, a television set-top box, a network appliance, or another type of network device.

Figure 2A:
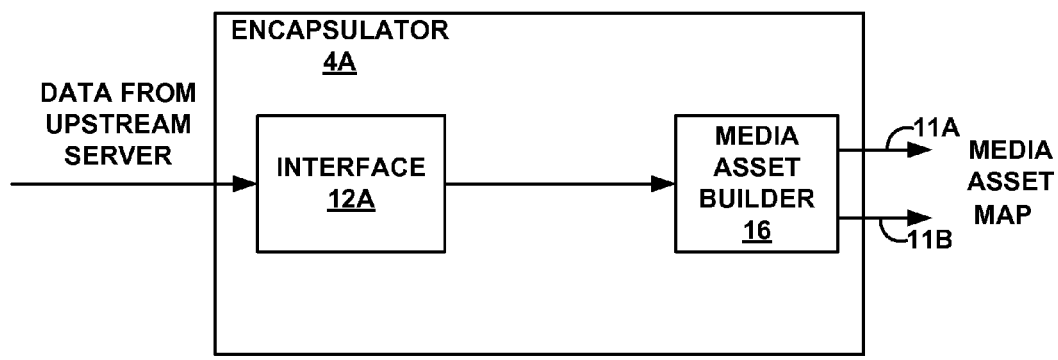
FIGS. 2A and 2B are block diagrams illustrating an exemplary encapsulator.

FIG. 2A is a block diagram illustrating an exemplary embodiment of encapsulator 4A. Encapsulator 4A may be software executing on a processor or server. In this example, encapsulator 4A includes interface 12A and media asset builder 16. Interface 12A provides an interface that allows encapsulator 4A to receive the requested video stream from the upstream media server 5 (FIG. 1A). For example, interface 12A may request the packetized video stream data from upstream server 5 by referencing the URL of upstream server 5. Interface 12A may be designed, in some embodiments, to receive the video stream from upstream server 5 using traditional digital media transport mechanisms such as real time streaming protocol (RTSP).

Interface 12A provides the packetized video stream to media asset builder 16. The function of media asset builder 16 will be described following the description of FIG. 2B. The media asset builder 16 shown in FIG. 2A is substantially similar to the media asset builder 16 shown in FIG. 2B.

Figure 2B:
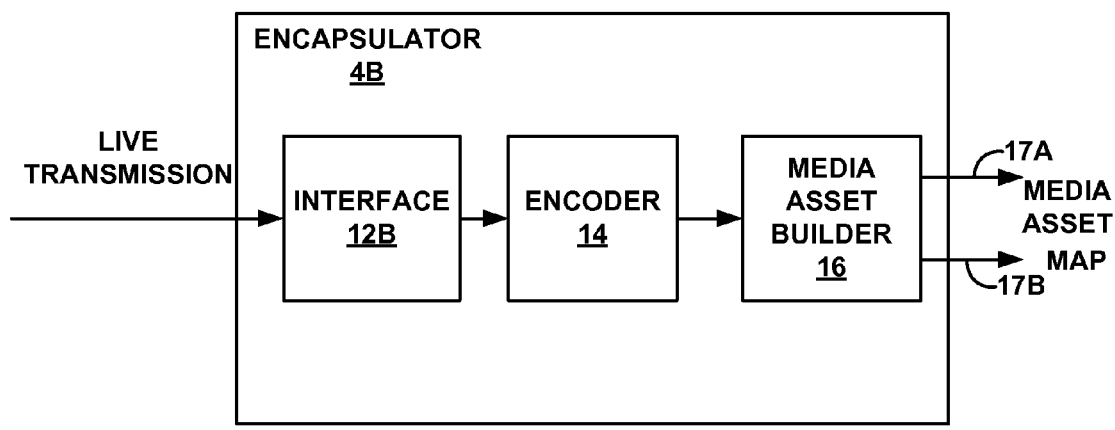

FIG. 2B is a block diagram illustrating an exemplary embodiment of encapsulator 4B. Encapsulator 4B may be software executing on a processor or server. Encapsulator 4B may include interface 12B, encoder 14, and media asset builder 16. Interface 12B provides an interface to receive the raw video data of a live event. Encoder 14 may encode the raw video data into a plurality of frames. Encoder 14 may generate intra-frames, as well as, bi-directional frames and predictive frames of the raw video data.

Media asset builder 16 receives the packetized video stream from interface 12A (FIG. 2A) or encoded data from encoder 14 (FIG. 2B). Media asset builder 16 generates media assets for the video stream and in some embodiments, media asset builder 16 may optionally include the corresponding map of datastamps or timestamps for the media assets. Additionally, media asset builder 16 may assign each one of the media assets a separate identifier such that each media asset may be individually addressable and selectively requestable by different downstream client devices.

Media asset builder 16 may generate media assets based on time intervals or data ranges. For example, media asset builder 16 may generate a media asset for every 40 seconds of live transmission, or media asset builder 16 may generate a media asset in 5 mega-byte data blocks. The media asset may be encoded with an average playback rate of 1 mega-bit per second. Therefore, a 5 mega-byte chunk would contain an average of 40 seconds of video (5 mega-byte data block multiplied by 8 bits per byte, divided by 1 mega-bit per second equals 40 seconds). A combination of 5 media assets would constitute 200 seconds of live transmission data. A media asset for every 40 seconds, a media asset of 5 megabytes, or a playback rate of 1 mega-bit per second is merely exemplary, the size of media asset and playback rate may be different in different embodiments. In some embodiments, media asset builder 16 may generate media assets that contain similar content, but the visual specification may be different in each media asset. For example, media asset builder 16 may generate a first media asset that contains data that needs to be viewed at a high playback rate, i.e., there is a high number of bits that the client device needs to display per unit of time. Media asset builder 16 may also generate a second media asset that contains similar data as the first media asset but needs to be viewed at a low playback rate, i.e., there is a low number of bits that the client device needs to display per unit of time.

Media asset builder 16 may generate media assets that can be viewed by most popular media players. For example, media asset builder 16 may generate files that can be viewed by Windows Media Player™ or Silverlight™ from Microsoft Corporation of Redmond, Wash., Quicktime™ from Apple Computer of Cupertino, Calif., and Flash Video™ from Adobe Systems, Inc. of San Jose, Calif., to name a few. For example, the media assets may be generated for the Windows Media Player in an advanced streaming format (ASF). Media asset builder 16 may generate media assets for other types of media players as well. Additionally, media asset builder 16 may require a particular protocol or codec in generating the media assets. For example, in system 1B (FIG. 1B) encoder 14 (FIG. 2B) may use a particular protocol or codec to generate the plurality of frames that media asset builder 16 uses to generate media assets. In some other embodiments, media asset builder 16 may generate the media assets independent of any particular protocol or codec. For example, in system 1A (FIG. 1A), in different embodiments, encapsulator 4A may receive the data stream in different protocols or codecs. In such embodiments, media asset builder 16 may generate the media assets independent of the type of protocol or codec used by upstream media server (FIG. 1A) to transmit the packetized video stream.

In some embodiments, for example the embodiment shown in FIG. 1B, media asset builder 16 may include metadata at the beginning of the media asset. The metadata may provide information for playing of a particular media asset. For example, the metadata may contain the identifier for the media asset. The metadata may contain the total number of bits in the media asset and the temporal duration of the media asset, i.e., how long the media asset should be played. Based on the total number of bits and the duration of the media asset, the playback rate of the media asset can be calculated by dividing the total number of bits by the duration. The metadata may also contain information about the particular codec or protocol used in encoding frames in the media asset. In some embodiments, the metadata may also contain a map of timestamps and/or datastamps for the particular media asset. The timestamps may define the beginning and ending of a particular media asset. The timestamp defining the beginning of the media asset may be the amount of time of live transmission that has occurred up to the beginning of the media asset. The timestamp defining the ending of the media asset may be the amount of time of live transmission that has occurred up to the end of the media asset. The datastamps may also define the beginning and ending of a particular media asset. The datastamp defining the beginning of the media asset may be the amount of data of live transmission that has occurred up to the beginning of the media asset. The datastamp defining the ending of the media asset may be the amount of data of live transmission that has occurred up to the ending of the media asset. Additionally, the timestamps and datastamps may indicate the locations of particular key frames within media assets.

Upon generating a media asset, media asset builder 16 assigns each media asset a name, i.e. identifier. The naming scheme may be any predictable naming technique. For example, media asset builder 16 may use sequential integers in naming consecutive media assets. As another example, media asset builder 16 may use some predictable naming technique, where the names are then encoded, and the client device requires a particular key from media server 6 to predict the names. The naming scheme allows users downloading the media assets to particularly address the media asset. As described, the naming scheme may be some predictable naming scheme such that the client device will be able to predict the name of the media asset it needs to download.

In addition to providing a predictable naming scheme as a technique to address media assets. In some embodiments, the client device may be able to address media assets based on the timestamps and datastamps. In one embodiment, media asset builder 16 may also generate a map of timestamps or datastamps for every media asset to allow client devices to individually address each media asset as well as request specific data ranges within each of the media assets. The timestamps may designate the time interval of data stored in a media asset. In other words, the timestamp maps a time interval of the live transmission to a media asset that contains data for that time interval of the live transmission. In other embodiments, media asset builder 16 may not map timestamps and instead map datastamps. In yet other embodiments, media asset builder 16 may generate a map of timestamps and datastamps. In such embodiments, media asset builder 16 defines a data range of the live transmission stored in a media asset. As another example, media asset builder 16 may also provide timestamps for key frames within each media asset. As described above, the timestamps may be stored as metadata within the media assets. In some embodiments, the timestamp may be stored separately from the media asset.

Figure 3:
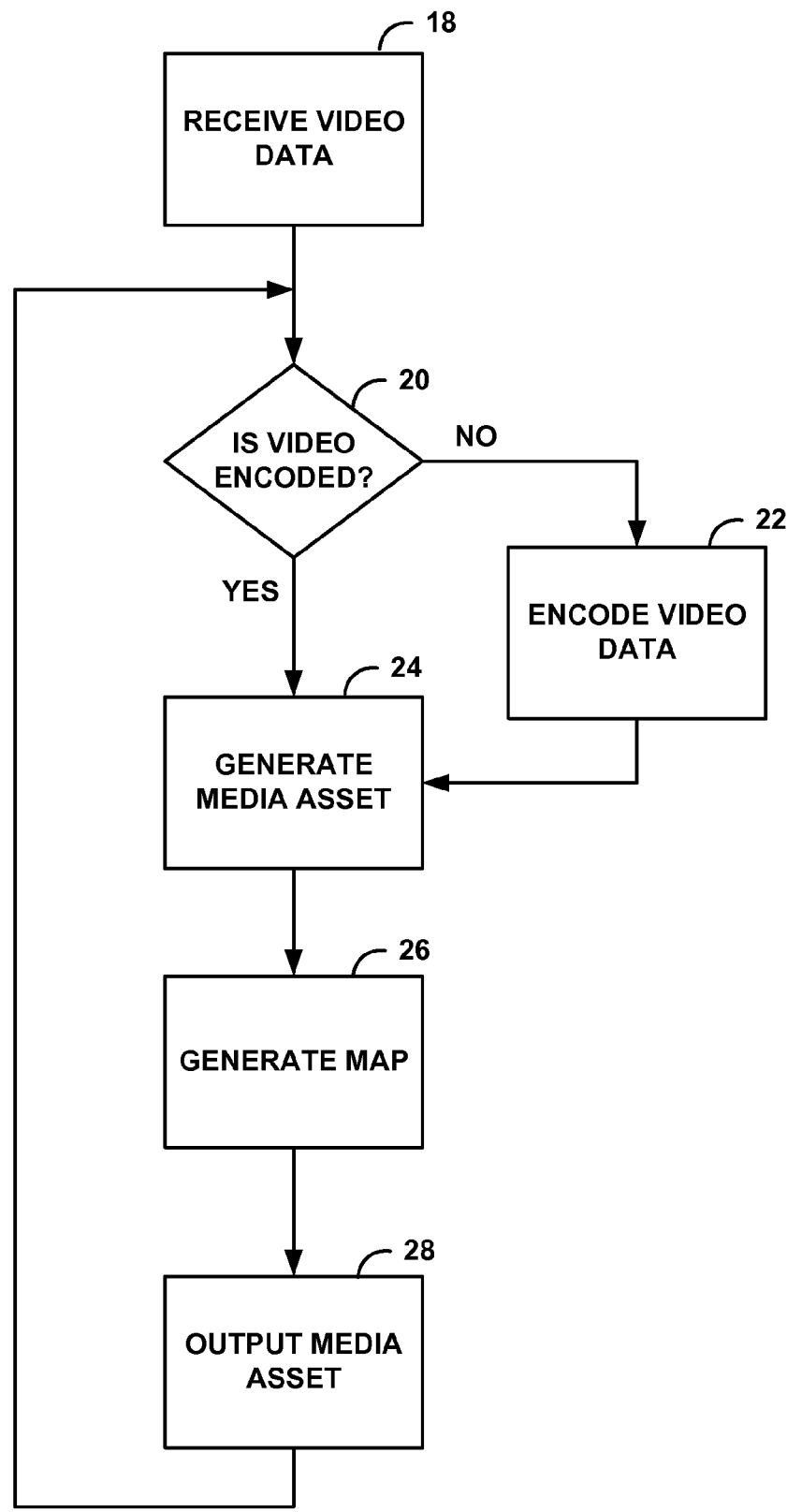
FIG. 3 is a flowchart illustrating an exemplary technique for generating a media asset.

FIG. 3 is a flow chart illustrating an exemplary technique of building media assets via encapsulator 4A or 4B. For clarity and ease of description, when encapsulator 4A and 4B perform similar functions, they will be referred to simply as encapsulator 4. In embodiments where encapsulator 4A and 4B perform different functions, specific reference will be made to either encapsulator 4A or 4B. Encapsulator 4 receives a live transmission of an event (18). Upon receiving the live transmission, in some embodiments, encapsulator 4 may determine whether the incoming live transmission is encoded, i.e. requires transcoding or requires no action (20). If the live transmission data is not encoded or requires no transcoding (NO of 20) then encoder 14 within encapsulator 4B will encode the live transmission to generate a plurality of frames such as intra-frames, bi-directional frames, and predictive frames (22). If the live transmission is already encoded (YES of 20) or after step (22) media asset builder 16 generates a media asset (24). The media asset may contain a certain amount of data, i.e. a 5 mega-byte file; alternatively, the media asset may contain data for a certain amount of time, i.e. 40 seconds of live transmission. In some embodiments, media asset builder 16 may generate via transcoding a plurality of media assets where each media asset contains data corresponding to the same time interval, but the visual playback specification of each media asset may be different. Media asset builder 16 may also assign the media asset a predictable name, as described in an exemplary flow chart in FIG. 4. Media asset builder 16 may generate a map of timestamps or datastamps for the media assets concurrently or after generating the media assets (26). The generation of a map of timestamps or datastamps may not be necessary in every embodiment.

The media asset may be addressable in different manners. As a first example, the media assets may be addressable based on the predictable naming scheme described in more detail as a flow chart in FIG. 4. As a second example, the media assets may be addressable based on a time interval defined by the timestamps. As a third example, the media assets may be addressable based on a data range defined by the datastamps.

In some embodiments, after media asset builder 16 generates a media asset and corresponding map, encapsulator 4 outputs the media asset and may output corresponding map of timestamps or datastamps to media server 6 (28). For example, in some embodiments, encapsulator 4A may output the media asset to media server 6 such that they are logical constructs represented as a separate file stored at media server 6. In some embodiments, encapsulator 4B may output the media asset to media server 6 such that they are separately addressable constructs stored within a memory of media server 6. In other embodiments, media asset builder 16 may generate the media asset and add the corresponding maps of timestamps or datastamps as metadata on to the beginning of the media asset. In such embodiments, maps of timestamps or datastamps are not output to media server 6. After outputting to media server 6, encapsulator 4 builds more media assets of the live transmission. Encapsulator 4 stops building media assets when the live transmission ends.

Figure 4:
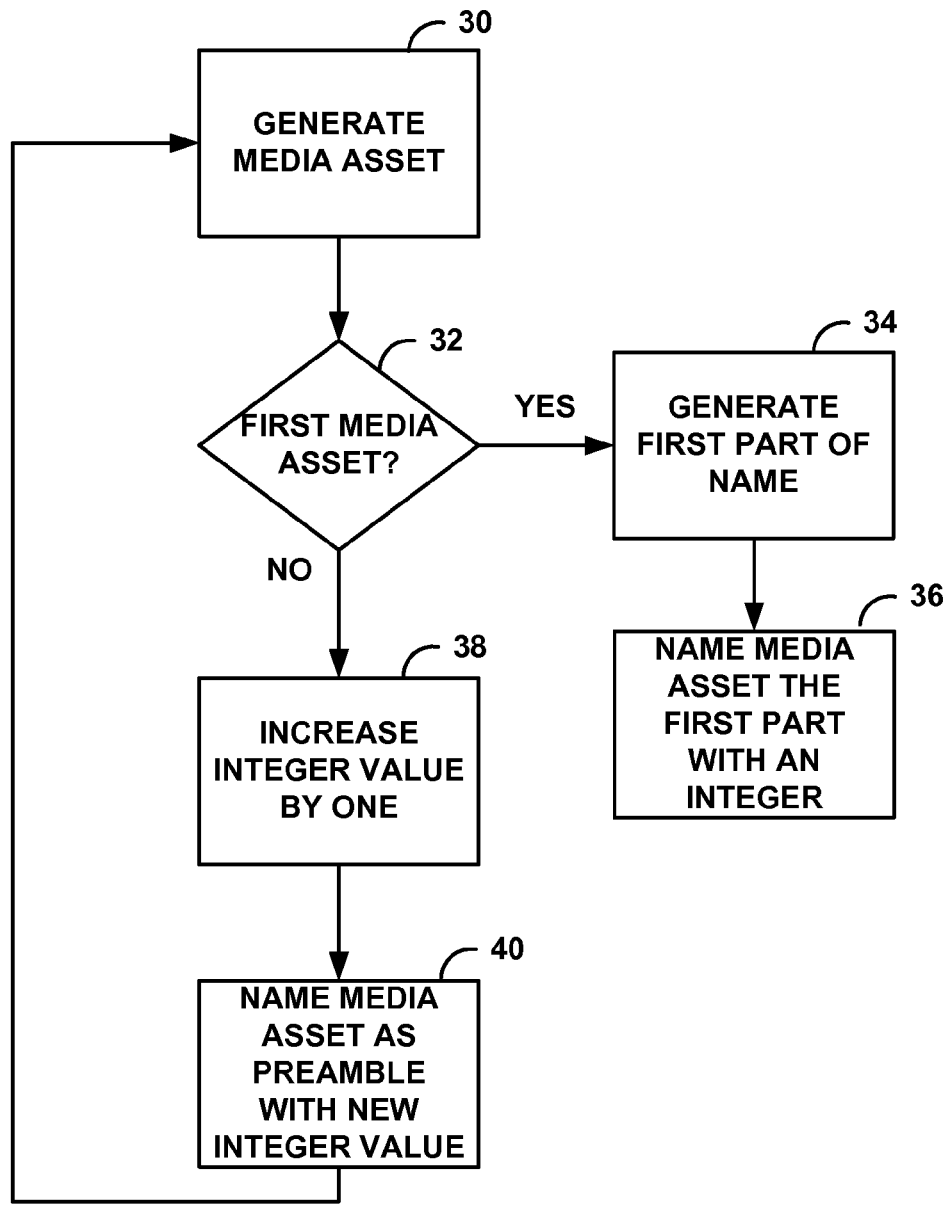
FIG. 4 is a flowchart illustrating an exemplary technique for generating the names for the media assets.

FIG. 4 is a flow chart of an exemplary technique of assigning a predictable name to a media asset. Media asset builder 16 generates a media asset in accordance with the invention, i.e. as described in FIG. 3 (30). Media asset builder 16 may then determine whether this is the first media asset, or whether previous media assets have been generated (32). If the current media asset is the first media asset (YES of 32), media asset builder 16 may generate a designation of the name for the media asset (34). Media asset builder 16 may use some unique designation in generating the first part of the name for the media asset. For example, assuming the live event is a U2 concert event, the first part of the name may be U2_concert. Clearly, other names may be possible to uniquely identify that it is U2 concert. In some embodiments, a unique name may not be necessary, and a simple name like mediafile or eventfile may be used. Media asset builder 16 may not use any of the example names, and may use a wholly different first part of the name. After generating the designation of the name, media builder 16 may add on an integer value, for example 1, at the end of the designation of the name, and assign the media asset the name of the first part and the integer value. For example, the first media asset may be named, eventfile1.

If the current media asset is not the first media asset (NO of 32), media asset builder 16 may increase the integer value used in naming the previous media asset (38). Media asset builder 16 may then name the media asset as the chosen first part (from step 34) along with the new integer value (40).

It is worth noting that the invention is not limited by the naming scheme described above. FIG. 4 merely describes one possible naming technique. Any naming technique may be used. For example, media asset builder 16 may use an encoded naming scheme. Client device 10 may download a key to decode the naming scheme from media server 6 before receiving the live transmission, and by using the key, client device 10 may be able to figure out the naming scheme used by media asset builder 16.

Figure 5:
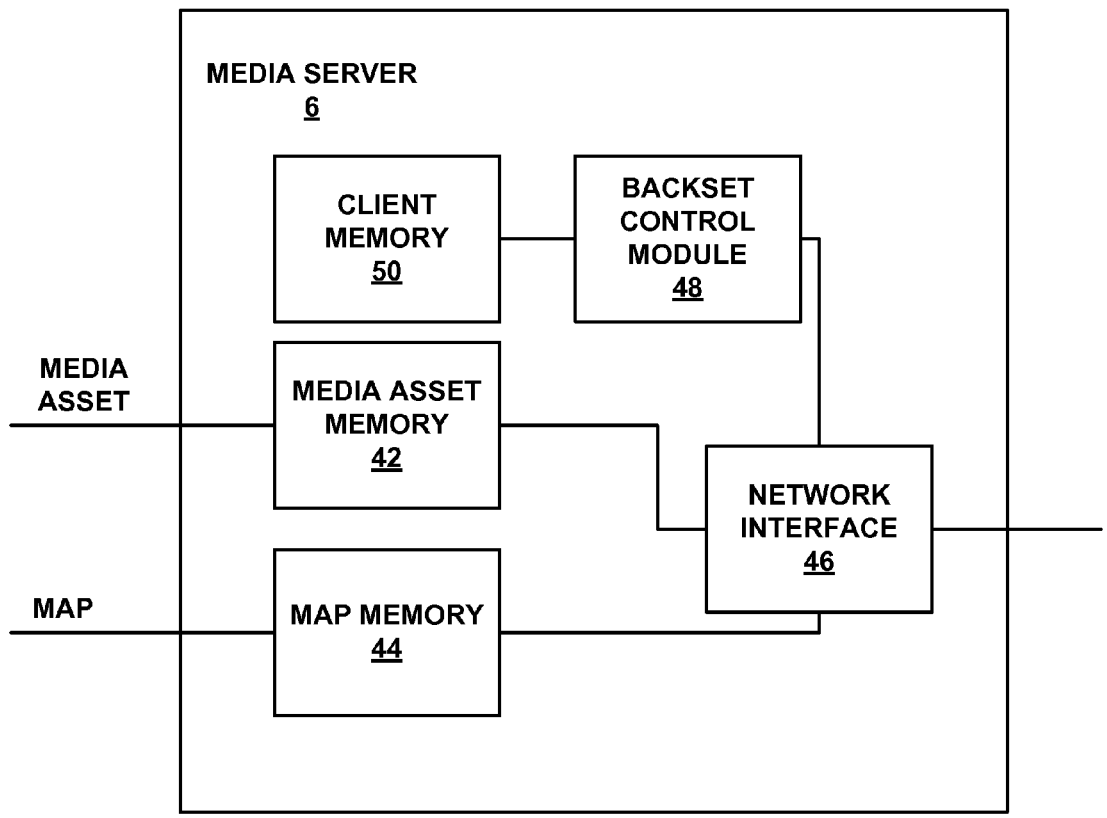
FIG. 5 is a block diagram illustrating an exemplary media server.

FIG. 5 is a block diagram illustrating an exemplary media server 6. For clarity, many of the blocks within media server 6 are omitted. Media server 6 may comprise media asset memory 42, map memory 44, backset control module 48, client memory 50, and network interface 46.

Media asset memory 42 stores all or some the media assets generated by encapsulator 4. Media asset memory 42 may be any type of device capable of storing data. For example, media asset memory 42 may be a hard drive, random access memory (RAM), or buffer, such as a first-in-first-out (FIFO) buffer, to name a few types of memory. Media asset memory 42 may store each media asset separately such that each media asset may be individually retrievable and downloadable. One example technique of retrieving and downloading each media asset may be to provide an HTTP address for each media asset. For example, the HTTP address for the first media asset may be http://www.example.com/mediafile1.flv.

Map memory 44 stores all or some of the maps for the corresponding media assets. It is worth clarifying that in embodiments where media asset builder 16 adds the map information on to the media asset as metadata, or that the maps were not required to be generated, map memory 44 may not be needed in media server 6. Similar to media asset memory 42, map memory 44 may be a hard drive, random access memory (RAM), buffer, such as a first-in-first-out (FIFO) buffer, to name a few types of memory. Media server 6 may provide the map information using HTTP addresses. An example for the first media asset may be http://www.example.com/mediafile1.flv from 0 seconds to 40 seconds.

Network interface 46 provides an interface for media server 6 with network 8. Network interface 46 may be an Ethernet interface, a WiFi interface, a token ring interface, a fiber optic interface, a Bluetooth interface, a Wireless Broadband interface, a WiMax interface, or another type of network interface. Network interface 46 may make available for streaming download the media asset from media asset memory 42 and map information from map memory 44, in embodiments where map memory 44 is needed, on to network 8 using, for example, hyper-text transport protocol (HTTP). Other streaming techniques may also be used.

In one embodiment, backset control module 48 determines a recommended backset for each client wishing to download media assets from media server 6. In an alternate embodiment, backset control module 48 determines the required backset for each client wishing to download media assets from media server 6. Backset control module 48 may determine the backset for each client based on a number of client devices currently downloading the live transmission, a geographical proximity of client devices currently downloading the live transmission, an actual throughput rate to each one of the plurality of client devices, and a historical actual throughput rate to each one of the plurality of client devices, to name a few possible characteristics. Backset control module 48 may use more or fewer client device characteristics in determining the backset. Alternatively, in some embodiments, the recommended backset value may be fixed and stored within media server 6. In such embodiments, backset control module 48 may not be necessary.

Media server 6 transmits the recommended backset value to the client device. In response, the client device may request the media asset or portion of the media asset from media server 6 that corresponds to the backset value. In some embodiments, the media server 6 may require that the client device download media assets that correspond to the recommended backset. In other embodiments, as described in more detail below, the client device may not download the media asset corresponding to the recommended backset value and instead determine a new backset value based on the recommended backset value. The client device may then request to download the media asset that corresponds to the new backset value.

In one embodiment, media server 6 may keep track of the number of clients wishing to download the live event in client memory 50. Client memory 50 may be a hard drive, random access memory (RAM), or buffer, such as a first-in-first-out (FIFO) buffer, to name a few types of memory. Due to the bandwidth limitations of media server 6, the more clients attempting to download the live transmission, generally translates into a lower possible transmission rate per client.

As one example, because a user wishing to download the live transmission may have a lower data throughput rate, the recommend backset for that user may be higher than for users who are already downloading the live transmission. The client device for that particular user may download the media asset that corresponds to the backset value, and then download subsequent media assets. Alternatively, in some embodiments, the client device for that particular user may download a portion of the media asset at a key frame, where the key frame corresponds to the backset value, and then download subsequent media assets. For example, media server 6 may transmit a recommended backset of 30 seconds. Each media asset may contain 40 seconds of live transmission data. The client device, in response, requests the media asset that corresponds to the backset or a portion of the media asset that corresponds to the backset. For example, in one embodiment, media server 6 may then transmit the media asset that corresponds to a backset of 40 seconds so that the client device receives the beginning of the media asset. Media server 6 may then transmit subsequent media assets. In another embodiment, media server 6 may check the metadata or maps of timestamps or datastamps of the media assets to find a key frame that most closely corresponds to a 30 second backset. Media server 6 may then transmit the remaining portion (i.e. 10 seconds) of the particular media asset following the key frame, and then transmit subsequent media assets. In such an embodiment, the client device is truly backset 30 seconds. Additionally, as will be described in more detail below, assigning a higher backset to a subsequent user also provides the advantage for the subsequent user to swarm data from source devices.

In another embodiment, backset control module 48 may determine the recommended backset for a user based on the proximate geographical location of other users that are currently downloading the live transmission. For example, if there are a significant number of users downloading the live transmission that are geographically proximate to one another, backset control module 48 may recommend a backset for the subsequent user such that the subsequent user downloads media assets that contain data that is temporally prior to the media assets that the geographically proximate users are downloading. The geographical location for users may be determined based on for example, the ISP network, network address, or network prefix that the users are using to download the live transmission and stored in client memory 50. As one example, the recommended backset for the first user downloading the live transmission may be low, i.e. virtually zero. For subsequent users that are geographically proximate to the first user that attempt to download the live transmission, the recommended backset may be greater. As will be described in more detail below, assigning a higher backset to a subsequent user also provides the advantage for the subsequent user to swarm data from source devices.

In another embodiment, backset control module 48 may determine the backset for a client based on the achieved bandwidth of the media asset received at the client device. The achieved bandwidth of the media asset received at the client device will be referred to as the actual throughput rate. For example, if the actual throughput rate for a plurality of users is less than ideal because there are too many users attempting to download the live transmission, media server 6 may backset all subsequent users. Clearly, this will not increase the actual throughput rate for the subsequent user. However, if the subsequent user is backset greater than other users downloading the live transmission, the subsequent user may be able to download in parallel media assets from other users. The user's actual throughput rate is stored in client memory 50.

In another embodiment, backset control module 48 may assign the backset based on historical throughput rates with a particular client. Media server 6 stores historical throughput rate data of all clients that have tried to download media assets from media server 6 in the past in client memory 50. Based on the historical throughput rates, backset control module 48 may establish a longer delay for clients who have historically had lower throughput rates, and shorter delays for client who have historically had faster throughput rates.

Basing the backset on the number of users, geographical proximity of the users, the actual throughput rate of the clients, and historical actual throughput rates of the clients are merely exemplary. Backset control module 48 may establish the backset based on more or fewer characteristics. In some embodiments, backset control module 48 may use all the characteristics to determine the backset. In other embodiments, backset control module 48 may use only some characteristics to determine the backset.

As described above, in some embodiments, media server 6 transmits a required backset to the client device. In these embodiments, the client device is required to be backset by the backset value determined by backset control module 48. In other words, the client device is backset by the value determined by backset control module 48 without any action by the client device. In these embodiments, the client device identifies and requests a media asset that contains encoded data for the live event at the point in time that corresponds to the backset As describe above, in some embodiments media server 6 transmits a recommended backset to the client device. In some embodiments, media server 6 transmits the recommended backset as well as additional parameters to allow the client device to calculate the backset. Additionally, in some embodiments, media server 6 transmits a maximum and/or minimum allowable backset to constrain the client's selection of the actual backset, as well as the recommended backset. In some additional embodiments, media server 6 transmits the recommended backset, a maximum and/or minimum allowable backset, as well as coefficients to allow the client device to calculate a backset that is within the range of the minimum and maximum allowable backset values. In some embodiments, media server 6 may transmit one or more parameters to allow the client device to calculate the backset value. For example, media server 6 may only transmit the recommended backset value and coefficients.

As described above, the recommended backset may be based on a number of client devices currently downloading the live transmission, a geographical proximity of client devices currently downloading the live transmission, an actual throughput rate to each one of the plurality of client devices, and a historical actual throughput rate to each one of the plurality of client devices, to name a few conditions that media server 6 may use to determine the recommended backset. Alternatively, the recommended backset may be fixed for all clients. In some cases, the client device may accept the recommended backset and identify and request a media asset that contains encoded data for the live event at the point in time that corresponds to the backset. In some embodiments, the client device may be permitted to disregard the recommended backset and request the most current media asset (i.e. zero backset). In some embodiments, the client device may be permitted to request a media asset that corresponds to a backset that is less than the recommended backset, but greater than the minimum allowable backset. In some embodiments, the client device may request a media asset that contains data corresponding to a backset that is greater than the recommended backset, but less than the maximum allowable backset. In these embodiments where the client device is constraint by the minimum and/or maximum backset value, media server 6 may transmit the media asset that most closely corresponds to the requested backset, and then transmit subsequent media assets. Alternatively, media server 6 may transmit a portion of the media asset starting with a key frame for the media asset that most closely corresponds to the point in time of the live transmission at the requested backset based on the maps of the timestamps or datastamps, and then transmit subsequent media assets.

In another embodiment, media server 6 may only transmit a maximum allowable backset to the client device. The client device may then, based on a distribution function, as one example, calculate a backset that is between a zero backset and the maximum allowable backset. For example, the distribution function may define a probabilistic distribution between zero and one to be used by the client to select the backset between a zero backset and the maximum allowable backset. The distribution function may be provided to the clients by the media server, or the clients may be pre-programmed with the distribution function. In this way, the media server may generally control the distribution of clients over the permissible range of backset.

In another embodiment, media server 6 may only transmit a minimum allowable backset to the client device. The client device may then, based on a distribution function, as one example, calculate a backset that is greater than the minimum allowable backset. For example, the distribution function may define a probabilistic distribution between a minimum value and one to be used by the client to select the backset that is greater than the minimum allowable backset. As before, the distribution function may be provided to the clients by the media server, or the clients may be pre-programmed with the distribution function. This is another way that the media server generally controls the distribution of clients over the permissible range of backset.

In another embodiment, media server 6 may only transmit a minimum and maximum allowable backset to the client device. As before, the client device may then, based on a distribution function, as one example, calculate a backset that is greater than the minimum allowable backset and less than the maximum allowable backset. For example, the distribution function may define a probabilistic distribution between a minimum value and one to be used by the client to select the backset that is greater than the minimum allowable backset and less than the maximum allowable backset. As before, the distribution function may be provided to the clients by the media server, or the clients may be pre-programmed with the distribution function. This is yet another way that the media server generally controls the distribution of clients over the permissible range of backset.

The client device requests the media asset that corresponds to the determined backset, i.e., that media asset that contains encoded video of the live event at the point in time specified by the backset. As described above, media server 6 transmits the media asset that most closely corresponds to the backset, or alternatively, transmits a portion of the media asset starting with a key frame for the media asset that most closely corresponds to the backset.

In addition, in some embodiments, media server 6 provides additional parameters such as coefficient values to the client device. The client device, based on the additional parameters and the distribution function, calculates a backset. The coefficient values may be chosen by the media server such that a majority of users downloading the live transmission will be backset by the recommended backset value, and a minority of users downloading the live transmission will be backset less than the recommended backset value.

The embodiments described above are merely exemplary. In different embodiments, media server 6 may transmit one or more of the parameters described above. For example, in one embodiment, media server 6 may transmit the minimum and maximum allowable backset, as well as the recommended backset. In such embodiments, the client device, based on a distribution function and recommended backset, calculates a backset that is less than the maximum allowable backset, and greater than the minimum allowable backset. As another example, media server 6 transmits the recommended backset as well as coefficient values to the client device. The client device then calculates the backset value based on the recommended backset and the coefficient values. Clearly there are other possible combinations. Such possible combinations are contemplated.

Figure 6:
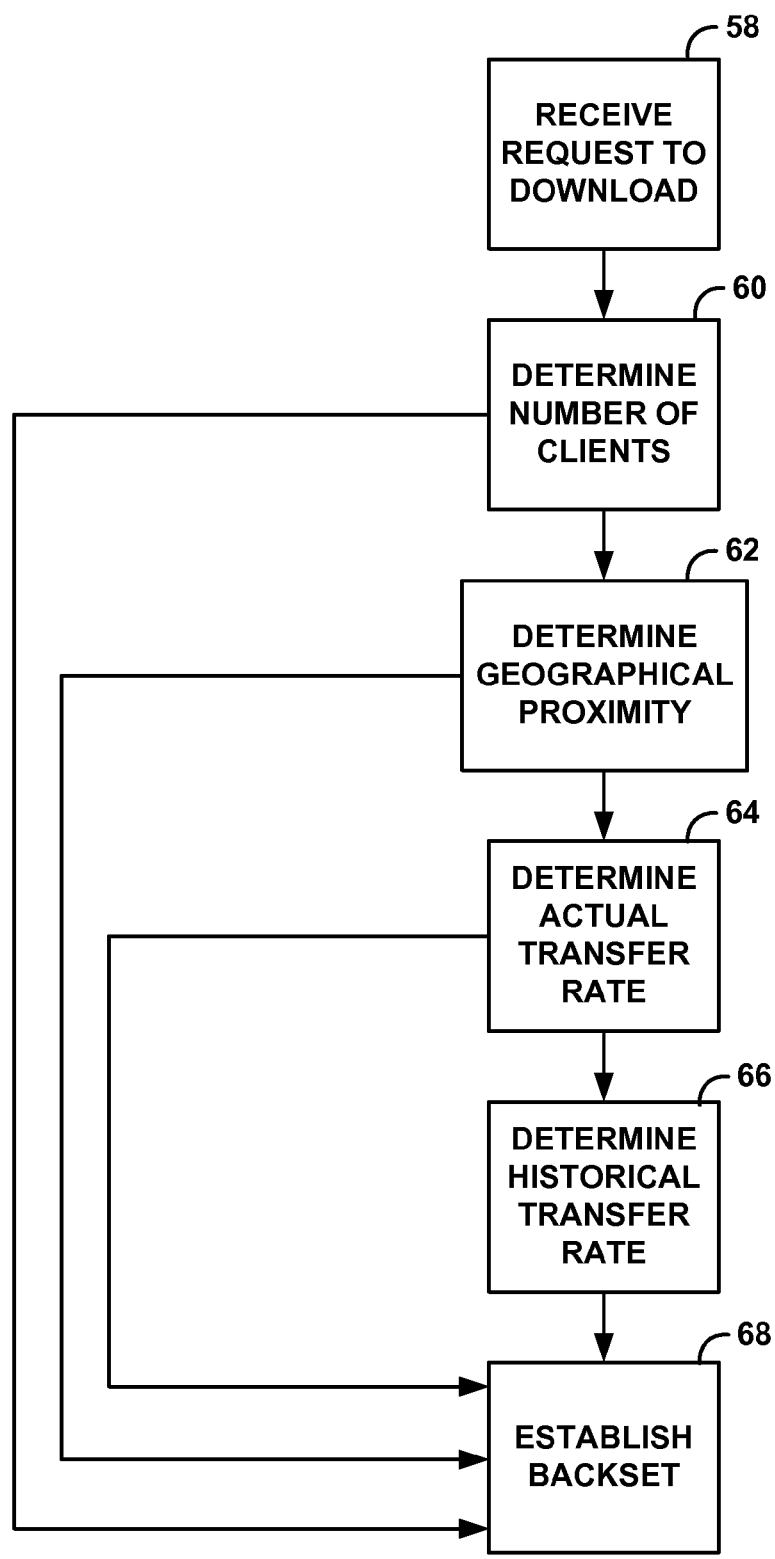
FIG. 6 is a flow chart illustrating an exemplary technique of establishing backsets for users.

FIG. 6 is a flow chart illustrating an exemplary technique of establishing backsets for clients. Media server 6 receives a request to download a live transmission (58). Media server 6 may then determine the number of clients currently downloading the live transmission and store that data in client memory 50 (60). Media server 6 may then determine the geographical proximity of clients that are currently downloading the media asset and store that data in client memory 50 (62). Media server 6 may then determine the actual throughput rate with the client and store that data in client memory 50 (64). Media server 6 may also determine the historical actual throughput rate for a user, assuming that the user had previously tried to download from media server 6, by looking it up in client memory 50 (66). Based on the data in client memory 50, backset control module 48 may establish the backset for a particular client (68).

Also, as shown in FIG. 6, backset control module 48 may use fewer characteristics in determining the backset. It should also be noted that while not expressly shown in FIG. 6, backset control module 48 may use any combination of the characteristics to establish the backset.

The following are some exemplary embodiments in accordance with the invention. For clarity, the examples provided below use numerical values to aide in understanding the invention. The numerical values are merely used for example, different embodiments may use different numerical values.

In one embodiment, after media server 6 determines the backset for the user, media server 6 may transmit the name and location of the media asset that encompasses the time interval corresponding to the backset. For example, assume that client device 10 requested to download the live transmission. Media server 6 determined that the backset for client device 10 is 7 seconds. Media server 6 may determine which media asset contains data that is 7 seconds prior to the current time of the live transmission. Media server 6 may then transmit the location and file name of the media asset that contains data that is 7 seconds prior to the current time of the live transmission. In this embodiment client device 10 will be backset more than just 7 seconds because the media asset that contains data that is 7 seconds prior may actually start 10 seconds prior to the current location of the live transmission. For clarity, assume that three media assets have been generated where each media asset contains 5 seconds of data, where mediafile1 contains data from 0-5 seconds, mediafile2 contains data from 5-10 seconds, and mediafile3 contains data from 10-15 seconds. A fourth media asset, mediafile4, is currently being generated, but only 4 seconds of the file is generated when client device 10 requests to download the live transmission. Mediafile3 contains data that is 7 seconds prior to the current time of the live transmission. Media server 6 may provide mediafile3 to client device 10. However mediafile3 starts 9 seconds prior to the current time of the live transmission. Therefore, even though media server 6 determined that client device 10 needs to be backset by 7 seconds, client device 10 may actually be backset by 9 seconds.

In one embodiment, as another example assume the same timing and file naming as described in the preceding paragraph. As before, media server 6 may determine that client device 10 requires mediafile3. A 7 second delay translates into 2 seconds into mediafile3. In this embodiment, media server 6 may transmit the file name and location of mediafile3, but may additionally transmit a temporal location and byte offset within mediafile3 that corresponds to 2 seconds into mediafile3. In this embodiment, client device 10 will download mediafile3, but client device 10 may not start to download mediafile3 at the beginning of mediafile3. Instead, client device 10 may start to download data of mediafile3 where the data corresponds to data that is 2 seconds into mediafile3. Client device 10 may know the location within mediafile3 that corresponds to 2 seconds into mediafile3 based on the map of timestamps or datastamps generated by encapsulator 4. In embodiments where the maps are added on as metadata to the beginning of the media asset, client device 10 may determine the location within mediafile3 that is 2 seconds into mediafile3 based on the metadata. In such an embodiment, client device 10 is truly backset by 7 seconds because client device 10 is downloading data that is 7 seconds prior to the current time of the live transmission.

In one embodiment, after media server 6 determines the backset for client device 10, media server 6 may transmit the amount of backset to client device 10. In techniques described in more detail below with respect to client device 10, client device 10 may determine based on the metadata which media asset, and what location within the media asset, to download. In other embodiments, media server 6 may transmit the backset and the map of timestamps or datastamps to client device 10. Client device 10 may determine, based on the backset and the maps, which media asset, and what location within the media asset, to download.

In one embodiment, while establishing different backset for clients drastically aides in reducing rebuffering delays, a client may still be required to rebuffer. For example, if the network connection for client device 10 abruptly breaks, client device 10 may not receive any data for a long period of time, during which all the buffered data is used up. After the connection is reestablished, client device 10 may have to pause to rebuffer more data.

To avoid pausing for rebuffering in the future, in accordance with the invention, a client that had to rebuffer will pause playback for a set amount of time which will increase by a set percentage with each subsequent instance of rebuffering. This pausing in playback will effectively, dynamically increase the client's actual backset above its initially determined value by increasing the magnitude of the difference between the most current media asset available on media server 6 and the media asset currently being played back on client device 10. For example, assume a client was initially backset by 5 seconds. Even with a 5 second backset, the client had to pause to rebuffer data due to a transient network delay. Client device 10 will artificially increase the duration of its own rebuffer by, for example, 30 seconds. During the rebuffer period, media server 6 can produce more media assets that client device 10 is not yet attempting to play. In this manner, when client device 10 is again able to download from the network in a timely fashion there will exist more as of yet unplayed media assets which the client will download and buffer to allow it to withstand future transient network problems. However, it may be possible for the client to have to pause again for rebuffering. If the client had to pause again for rebuffering, rather than delaying for the pervious 30 seconds, client device 10 may opt to delay for 30 seconds plus 10% for a total of 33 second delay. For all subsequent delays, client device 10 may increase its self imposed delay by an additional 10%. In some embodiments, during the rebuffer period, client device 10 displays previously downloaded commercials. For example, when client device 10 initially requested to download media assets from media server 6, another media server (one not shown in the FIGS.) may transmit commercials to client device 10, for example a 30 second commercial for a product. In another example, client device 10 may establish a connection with media server 6 before the occurrence of the live event. In this example, a media server (one not shown in the FIGS.) may transmit commercials to client device 10.

The 30 second and the 10% increments are merely exemplary to clarify the delay technique. In different embodiments, client device 10 may increase or decrease its backset by different delay values. Also different embodiments may not use a progressive 10% increase, and may use a higher or lower percentage increase. Additionally, the increase in backset for subsequent rebuffering pauses may not be a percentage, but a fixed time backset. In some embodiments, the rebuffer delay may decrease over time as the events that caused the rebuffer delay retreat into the past. Also, the 30 second commercial for a product is just one example, the commercial may be longer or shorter, and the commercial does not have to be for a product.

Figure 7A:
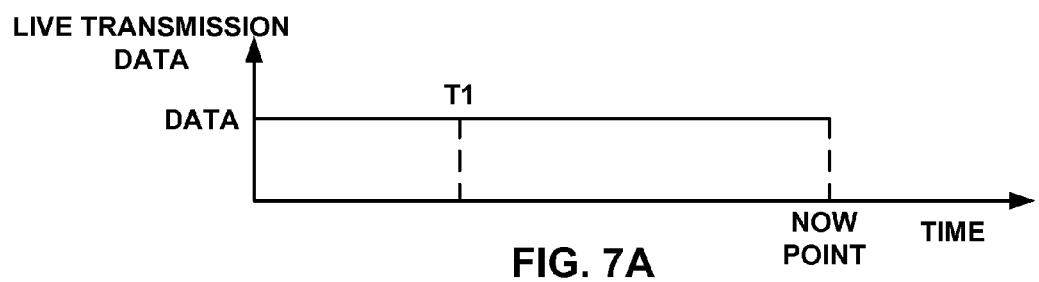
FIGS. 7A-7C are timing diagrams illustrating exemplary delay times for users.
Figure 7B:
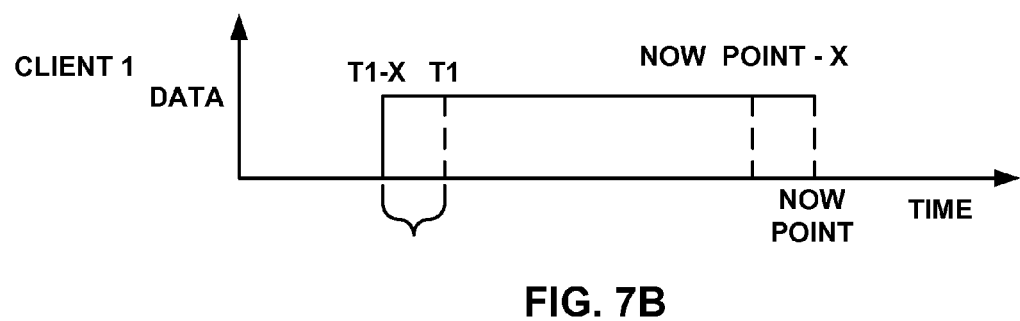
Figure 7C:
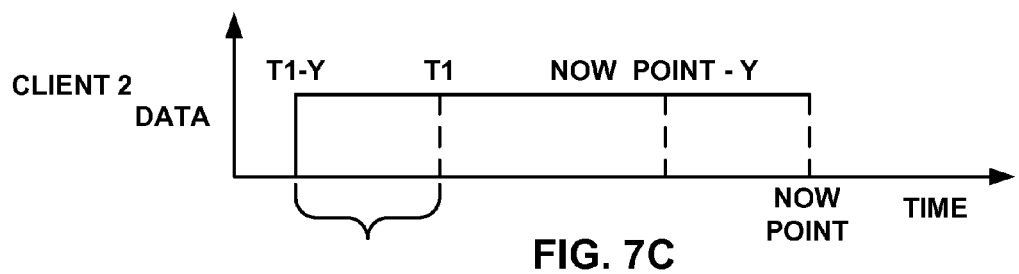

FIGS. 7A-7C are timing diagrams illustrating exemplary backset times for clients. FIG. 7A is a timing diagram showing transmitted data from a live transmission. In FIG. 7A, the "NOW POINT" refers to the actual point of the live transmission, i.e. the current moment of the live event. Marker T1 designates a time when both client 1 and client 2 decided to view the live event.

FIG. 7B is a timing diagram of the data of the live transmission downloaded by client 1. As noted above, client 1 requested to download the live transmission at time T1. Backset control module 48 may establish the backset for client 1 based on the number of clients, geographical proximity of the clients to one another, actual throughput rate, or historical actual throughput rate. Based on the characteristics, backset control module 48 established that client 1 needs to be backset by X. Therefore, client 1 started to view what was happening at the live event X seconds before what was happening at the live event at time T1, even though client 1 requested to view the live transmission at T1. When the live transmission is at the "NOW POINT," client 1 is viewing what was happening at the live event X seconds before the "NOW POINT."

FIG. 7C is a timing diagram of the data of the live transmission downloaded by client 2. As noted above, client 2 requested to download the live transmission at time T1. Backset control module 48 may establish the delay for client 2 similar to establishing the delay for client 1. Based on the characteristics, backset control module 48 established that client 2 needs to be backset by Y. Therefore, client 2 started to view what was happening at the live event Y seconds before what was happening at the live event at time T1, even though client 2 requested to view the live transmission at T1. When the live transmission is at the "NOW POINT," client 2 is viewing what was happening at the live event Y seconds before the "NOW POINT." As can be seen, client 2 was backset more than client 1. The variable backset between client 1 and client 2 may be due to the characteristics of client 1 and client 2.

Figure 8:
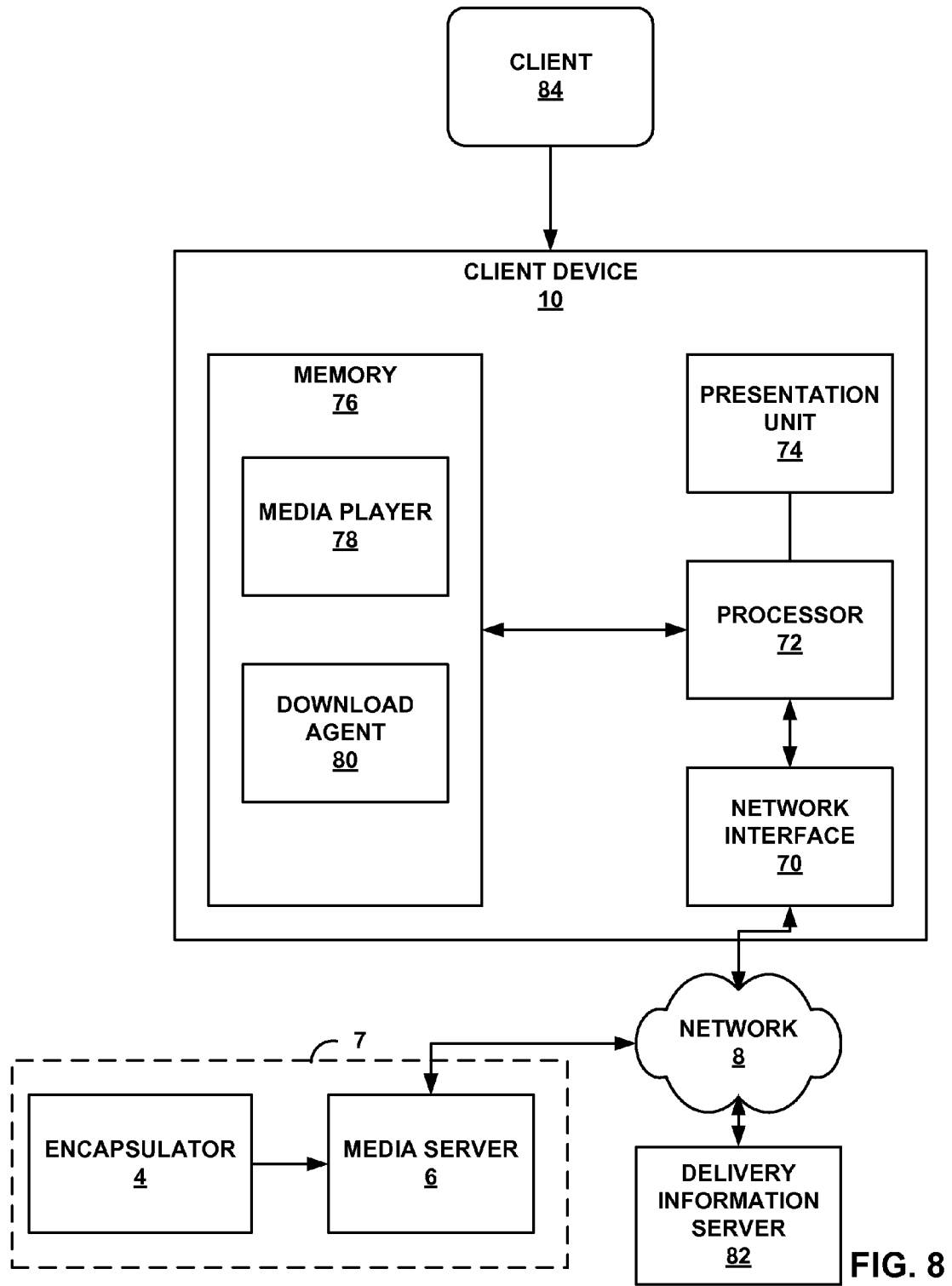
FIG. 8 is a block diagram illustrating an exemplary system in which a download agent selects the media asset from a media server.

FIG. 8 is a block diagram illustrating an exemplary client device 10. For reference MCP 7 is shown similar to FIGS. 1A and 1B. Delivery information server 82 is equivalent to delivery information server 9 of FIGS. 1A and 1B. In the example of FIG. 8, client device 10 includes a network interface 70, a memory 76, a processor 72, and a presentation unit 74. Network interface 70 facilitates communication between client device 10 and network 8. Network interface 70 may be a variety of different types of network interface. For example, network interface 70 may be an Ethernet interface, a WiFi interface, a token ring interface, a fiber optic interface, a Bluetooth interface, a Wireless Broadband interface, a WiMax interface, or another type of network interface. Memory 76 may be a computer-readable medium such as a Random Access Memory unit, a disk drive, an optical disc, a floppy disk, a Flash memory unit, or another type of computer-readable medium. Processor 72 may be a microprocessor that includes one or more cores, an application-specific integrated circuit (ASIC), co-processor, or another type of integrated circuit. Processor 72 may execute instructions stored in memory 76. When processor 72 executes instructions stored in memory 76, the instructions may cause processor 72 to perform one or more actions. Presentation unit 74 may be a computer monitor, a television set, an integrated video screen, speakers, digital signage, a video projector, or another type of unit capable of presenting media.

In the example of FIG. 8, memory 76 includes a media player 78 and a download agent 80. Media player 78 and download agent 80 may be sets of software instructions that, when executed cause processor 72 to perform various actions. For ease of explanation, when this disclosure states that media player 78 performs some action or states that download agent 80 performs some action, such phrases may be interpreted to mean that the instructions of media player 78 cause processor 72 to perform the action or to mean that the instructions of download agent 80 cause processor 72 to perform the action. However, it should be appreciated that in some implementations, media player 78 and/or download agent 80 may be implemented at least in part as hardware, in which case media player 78 and/or download agent 80 may perform some or all of the actions without any action by processor 72. Furthermore, it should be appreciated that in some implementations media player 78 and download agent 80 may be part of a common software package. In other words, the functionality of download agent 80 may be incorporated into media player 78.

A client 84 of client device 10 may interact with media player 78 when client 84 wants client device 10 to present a media asset. Example commercial media player applications include Windows Media Player™ or Silverlight™ from Microsoft Corporation of Redmond, Wash., Quicktime™ from Apple Computer of Cupertino, Calif., and Flash Video™ from Adobe Systems, Inc. of San Jose, Calif. Client 84 may directly or indirectly instruct media player 78 to present a media asset. For example, client 84 may directly instruct media player 78 to present a media asset by inputting a Uniform Resource Locator associated with the media asset into a prompt presented by media player 78. In a second example, client 84 may indirectly instruct media player 78 to present a media asset by navigating a web browser application to a web page in which the media asset is embedded. In this second example, the web browser application may automatically instruct media player 78 to present the media asset.

When media player 78 is instructed to present a media asset, media player 78 may directly or indirectly instruct download agent 80 to retrieve the media asset. For example, media player 78 may use inter-process communication to directly instruct download agent 80 to retrieve the media asset. In another example, media player 78 may instruct an operating system of client device 10 to retrieve the media asset. In this example, the operating system may instruct download agent 80 to retrieve the media asset.

In some examples, when download agent 80 is instructed to retrieve the media asset, download agent 80 may cause network interface 70 to output a media asset request to a delivery information server 82 via network 8. The request may specify a resource identifier, such as a file name, of the media asset. For example, download agent 80 may cause network interface 70 to output a Hypertext Transfer Protocol (HTTP) request that specifies a Uniform Resource Locator (URL) of the media asset, for example, http://www.example.com/media-file1.flv. Delivery information server 82 may be operated by MCP 7. Alternatively, delivery information server may be operated by a service that is independent of MCP 7. For example, delivery information server 82 may be operated by a third party.

Delivery information server 82 may be configured to implement a data transfer policy established by MCP 7. The data transfer policy may indicate a desired overall bandwidth utilization. The desired overall bandwidth utilization is the amount of bandwidth that MCP 7 wants to utilize at a given point in time. For example, a data transfer policy may indicate that MCP 7 wants to maintain an overall bandwidth utilization of 100 megabytes/second. A data transfer policy may indicate that MCP 7 wants to maintain different bandwidth utilization at different times. For example, a data transfer policy may indicate that MCP 7 wants to utilize 100 megabytes/second of bandwidth between the hours of 5:00 AM and 9:00 PM and utilize 90 megabytes/second bandwidth between the hours of 9:00 PM through 4:59 AM.

When delivery information server 82 receives a request from client device 10 that indicates a media asset, delivery information server 82 may, in response to the request, select the media asset from MCP 7 to maintain an anticipated overall bandwidth utilization of MCP 7. The anticipated overall bandwidth utilization represents an overall bandwidth utilization that MCP 7 anticipates to maintain while transferring the version of the media asset and transferring media assets in response to other requests, including those from other client devices. In this way, delivery information server 82 may select versions of media assets provided by MCP 7 such that the overall bandwidth utilization of MCP 7 is approximately equal to the desired bandwidth utilization specified by a data transfer policy. As a result, MCP 7 selects the highest playback rate versions of media assets such that the overall bandwidth utilization when transferring the versions of the media assets is not likely to exceed the desired overall bandwidth utilization.

After delivery information server 82 selects the version of the media asset, delivery information server 82 may cause MCP 7 to transfer the selected version of the media asset. Delivery information server 82 may cause MCP 7 to transfer the selected version of the media asset in a variety of ways. For example, delivery information server 82 may send a message to client device 10 that directly or indirectly indicates the media asset that is encoded for the desired playback rate. When client device 10 receives the message from delivery information server 82, download agent 80 may cause network interface 8 to output a request to media server 6 for the media asset. For example, delivery information server 82 may send a message to client device 10 that specifies the name of the particular media asset. In this example, download agent 80 may send a request to media server 6 that specifies a resource identifier of the media asset.

In an alternative implementation, when download agent 80 is instructed to retrieve the media asset, download agent 80 may cause network interface 70 to output a request for the media asset to media server 6. The request may specify a resource identifier of the media asset. When media server 6 receives the request, media server 6 may send a request to delivery information server 82 for the particular file name, time range, or data range requested by client device 10. In response, delivery information server 82 may select the appropriate media asset and send the requested media asset to media server 6. Media server 6 may then send a version of the requested media asset. Download agent 80 may also verify that the data is properly transferred from MCP 7 and properly received by client device 10. Download agent 80 may, for example, use whole file checksums, hashes, or partial hashes such as Merkle Hash Trees to verify the correctness of the received content.

Delivery information server 82 is shown only for illustration purposes. Delivery information server 82 may not be necessary in all embodiments of the invention. For example, in yet another alternative implementation, delivery information server 82 may not be necessary. In such examples, when download agent 80 is instructed to retrieve the media asset, download agent 80 may cause network interface 70 to output a request for the media asset to media server 6. The request may specify a resource identifier of the media asset. When media server 6 receives the request, media server 6 may select the appropriate media asset and send the appropriate version of the requested media asset to client device 10. Download agent 80 may also verify that the data is properly transferred from media server 6 and properly received by client device 10. Download agent 80 may, for example, use whole file checksums, hashes, or partial hashes such as Merkle Hash Trees to verify the correctness of the received content.

As described herein, download agent 80 is capable of transitioning between different media assets for delivery of the requested media asset provided by media server 6. For example, download agent 80 is capable of downloading and playing back a media asset associated with a time interval or range of data and dynamically switching to another media asset at the conclusion of the first media asset. Download agent 80 forecasts and initiates the switch to a different media asset such that seamless transition occurs from the current media asset to a new media asset at the same time-based playback point within both representations. As a result, the transition is seamless to the end-client 84 without introducing delay or jitter and without requiring a pause to rebuffer the data.

Figure 9:
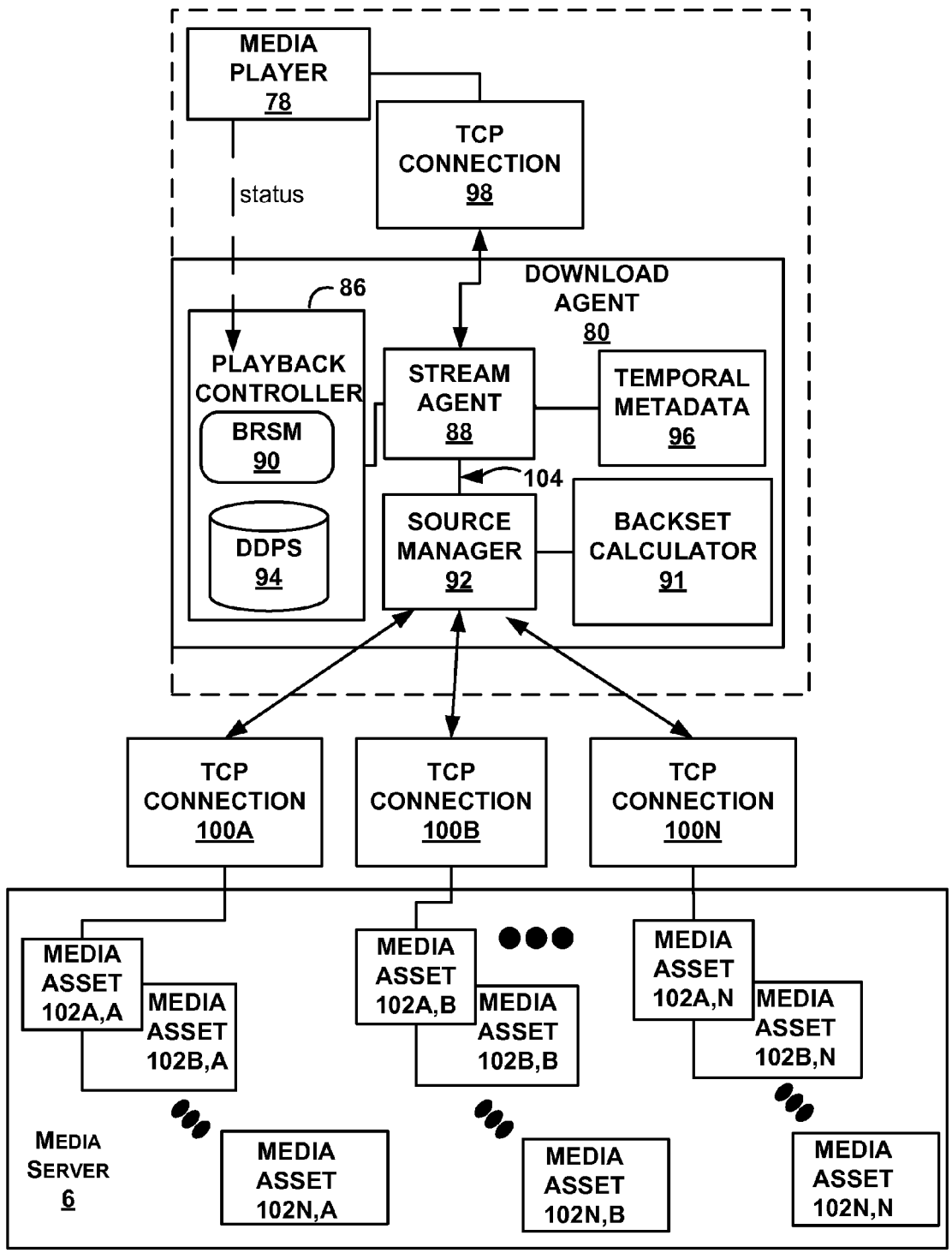
FIG. 9 is a block diagram illustrating an exemplary download agent connected to a media server.

FIG. 9 is a block diagram illustrating an exemplary download agent 80 connected to a media server 6. For clarity, the other components on client device 10 have been omitted to show the relationship between download agent 80 and media server 6. In the example embodiment, download agent 80 includes playback controller 86, stream agent 88, source manager 92, and temporal metadata 96. For purpose of example, media player 78 is shown as external to download agent 80, however, as described above, download agent 80 may encapsulate media player 78.

As shown in FIG. 9, download agent 80 provides content to media player 78 via a single TCP connection 98 internal to client device 10. Download agent 80 may, for example, open and maintain a single socket connection for communication of downloaded media content to media player via TCP connection 98. In this example, TCP connection 98 may be a standard transmission control protocol (TCP) connection used in Open Systems Interconnection Basic Reference Model (OSI). TCP connection 98 remains constant between media player 78 and download agent 80 regardless of the time interval of a particular media asset that are being downloaded by download agent 80; download agent 80 seamlessly splices the different media assets onto TCP connection 98 so that media player 78 is unaware of any switches between media assets selected by download agent 80. In some examples, download agent 80 provides the media assets to media player 78 at the same rate as the playback rate of the media assets. Download agent 80 meters the playback rate of the media asset to provide the media assets to media player 78 at the same rate as the playback rate of the media assets. In this manner, download agent 80 uniformly provides data to media player 78 rather than in bursts of data.

Media server 6 may include a plurality of media assets 102A,A-102N,C (herein referred to as "media assets 102") that generally represent exemplary media assets. As shown in FIG. 9, each one of media assets 102 is designated by two letters, for example 102A,A. For clarity, the first letter represents a media asset for a particular time interval. For example, media assets 102A,A-102N,A may contain data of a live transmission that correspond to a particular time interval. Media asset 102A,A contains data of live transmission from 0 minutes to 40 seconds, media asset 102B,A contains data of live transmission from 40 seconds to 80 seconds, and so on. For clarity, the second letter represents a media asset with a particular visual playback specification. For example, media asset 102A,A and media asset 102A,B contain similar content (e.g., the same movie), but the playback rates for media asset 102A,A and media asset 102A,B is different. In this example, media asset 102A,A has a playback rate of 100 kilo-bits per second, and media asset 102A,B has a playback rate of 50 kilo-bits per second. In another embodiment, media assets 102A,A-102A,C through 102N,A-102N,C may each contain similar content (e.g., the same movie), but at different encoding quality. In other embodiments, media assets 102A,A-102A,C through 102N,A-102N,C may contain both data of a live transmission that correspond to a particular time interval, and similar content but at different encoding quality.

Media assets 102A,A-102N,A can be considered to be a first set of media assets 102. In this first set of media assets 102, each one of the media assets 102 contains data of a live transmission that correspond to a particular time interval. Also in this first set of media assets 102, each one of media assets 102 has the same playback rate. Media assets 102A,B-102N,B can be considered to be a second set of media assets 102. In this second set of media assets 102, each one of the media assets 102 contains substantially similar content as the media assets 102 of the first set. In the second set of media assets 102, each one of media assets 102 has the same playback rate, but the playback rate for the second set of media assets 102 is different from the playback rate of the first set of media assets 102. Similarly, media assets 102A,C-102N,C can be considered to be a third set of media assets 102. In this third set of media assets 102, each one of the media assets 102 contains substantially similar content as the media assets 102 of the first and second set. In the third set of media assets 102, each one of media assets 102 has the same playback rate, but the playback rate for the third set of media assets 102 is different from the playback rate of the first and second sets of media assets 102.

The number of media assets shown in FIG. 9 is one example. There may be more or fewer media assets. As shown in FIG. 9, download agent 80 may initiate and establish a plurality of different TCP connections 100A-100N (herein referred to as "TCP connections 100") through network 8 for downloading one or more of media assets 102 from media server 6.

In general, source manager 92 handles connection management for access and retrieval of data from media assets 102 within media server 6. In one embodiment, source manager 92 sequentially access and retrieves data from media assets 102. Source manager 92 handles all specific implementation details necessary for acquiring the media data and providing the data to stream agent 88. In this example, source manager implements a plurality of TCP network stacks and may concurrently handle multiple TCP connections 100 to media server 6. Source manager 92 de-multiplexes the input data streams from media assets 102 as directed by stream agent 88.

As a review of the contents of media assets 102 as described above, in the context of video, each of media assets 102 typically contains a plurality of video frames encoded in accordance with a video compression scheme. One type of frame is referred to as a key frame or intra picture that can be decoded without reference to other frames and may, for example, provide an entire encoded picture. The term "key frame" is used herein to generally refer to this type of frame within an encoded media stream. Between each key frame are predicted pictures or bi-predicted pictures that generally contain image data and motion vector displacements that are relative to the previous key frame in the media asset. Download agent 80 coordinates and initiates dynamic transition such that the cut-over from one media asset of a set of media assets 102 to a media asset of another set of media assets 102 occurs at a video frame that is not dependent on other video frames within the stream, i.e., a key frame.

In general, stream agent 88 is responsible for serializing disparate streams of media assets 102 into a valid output stream for delivery to media player 78 via TCP connection 98 while additionally performing any required transformations to the stream data in the form of transitions between media assets 102. In one embodiment, media server 6 transmits a required backset. In such embodiment, backset calculator 91 accepts the backset value, and performs no additional processing. Source manager 92 may identify and request a media asset that contains encoded data for the live event at the point in time that corresponds to the backset.

In one embodiment, media server 6 transmits a recommended backset to client device 10. In one embodiment the recommended backset is a maximum allowable backset. Alternatively, in one embodiment the recommended backset is a minimum allowable backset. The recommended backset may be based on the number of clients currently downloading the live transmission, the number of clients currently downloading the live transmission that are geographically proximate to one another, the actual throughput rate, or the historical throughput rate to name a few conditions that media server 6 may use to determine the recommended backset. In one embodiment, backset calculator 91 may accept the recommended backset. Source manager 92 may identify and request a media asset that contains encoded data for the live event at the point in time that corresponds to the backset.

In some embodiments, backset calculator 91 may disregard the recommended backset, and source manager 92 may request the most current media asset (i.e. zero backset). In some embodiments, backset calculator 91 may calculate a backset that is less than the recommended backset. Source manager 92 may request a media asset that corresponds to a backset that is less than the recommended backset. Alternatively, backset calculator 91 may calculate a backset that is greater than the recommended backset. Source manager 92 may request a media asset that corresponds to a backset that is greater than the recommended backset, but less than the maximum allowable backset. In these embodiments, stream agent 88 may download the media asset that most closely corresponds to the requested backset, and then download subsequent media assets. Alternatively, stream agent 88 may download a portion of the media asset starting with a key frame for the media asset that most closely corresponds to the point in time of the live transmission at the requested backset based on maps of the timestamps or datastamps. In one embodiment, the maps of the timestamps or datastamps are stored as metadata within the media asset. In another embodiment, source manager 92 may receive the maps of timestamps or datastamps from media server 6. The technique of correlating the maps of timestamps or datastamps is described in more detail below.

In another embodiment, media server 6 may only transmit a maximum allowable backset to client device 10. Backset calculator 91 may then, based on a distribution function as one example, calculate a backset that is between a zero backset and the maximum allowable backset. For example, the distribution function may define a probabilistic distribution between zero and one to be used by the client to select the backset between a zero backset and the maximum allowable backset. The distribution function may be provided to client device 10 by the media server, or client device 10 may be pre-programmed with the distribution function. In this way, the media server may generally control the distribution of clients over the permissible range of backset.

Source manager 92 may then request the media asset that corresponds to the determined backset, i.e., that media asset that contains encoded video of the live event at the point in time specified by the backset. Stream agent 88 may download the media asset that most closely corresponds to the backset, or alternatively, stream agent 88 may download a portion of the media asset starting with a key frame for the media asset that most closely corresponds to the backset.

In addition, in some embodiments, media server 6 may also provide additional parameters such as coefficient values to client device 10. Parameter calculator 91 may then, based on the additional parameters and the distribution function, calculate a backset. The coefficient values may be chosen by the media server such that a majority of users downloading the live transmission will be backset by the recommended backset value, and a minority of users downloading the live transmission will be backset less than the recommended backset value.

In another embodiment after backset calculator 91 calculates the backset, upon an initial request by client 84 to download a particular media asset. In one example embodiment, stream agent 88 may access the media assets 102 for one of the sets of media assets 102. For example, stream agent 88 access the first set of media assets 102A,A-102N,A. Stream agent 88 downloads metadata contained within a first segment of each of the media assets for the first set of media assets. For example, the metadata within each of media assets 88 may indicate that video frames in the media object are encoded in accordance with the H.264 format. Furthermore, the metadata may include the number of bits in the media asset and the duration of the media asset. Stream agent 88 can then calculate the playback rate of the media asset by dividing the total number of bits by the duration of the media asset. In addition, the metadata may indicate other data such as copyright information, whether the media is to be presented in black and white, information that identifies an artist associated with the media object, and other information. The metadata may also include the file name of the media asset. In addition, in some embodiments, the metadata contained within each of media assets 102 includes maps of timestamps and/or datastamps. In one embodiment upon an initial request by client 84 to download a particular media asset, stream agent 88 accesses the maps of timestamps or datastamps of the first set of media assets 102A,A-102N,A to determine at which point within the media asset that download agent 80 needs to start downloading from.

After determining which point within the media asset that download agent 80 needs to start downloading from, in some embodiments, based on the downloaded metadata, temporal metadata 96 correlates the map of timestamps for key frames for the different sets of media assets 102 to byte offsets in the various media asset formats. For example, if stream agent 88 determined that download agent 80 needs to start downloading from 102B,A, temporal metadata 96 correlates the map of timestamps for key frame for media asset 102B,B and 102B, C. Similarly, temporal metadata 96 correlates the map of timestamps for key frames for media assets 102C,A, 102C,B, and 102C,C, and so on. Temporal metadata 96 correlates the map of timestamps for the different key frames in each one of the sets of media assets 102.

In one example, temporal metadata 96 may be arranged as an array or other data structure that identifies sets of key frames that identify the temporal order of the media assets. Temporal metadata 96 then correlates the key frames of each of the sets to appropriate byte offsets within media assets 102. In this way, the byte offsets within media assets for temporally proximate key frames are correlated and stored within temporal metadata 96. In some embodiments, metadata 96 is not necessary.

In some embodiments, temporal metadata 96 may not be part of download agent 80. Instead temporal metadata 96 may reside on either media server 6 or delivery information server 82. In these embodiments, temporal metadata 96 may be considered to be map memory 44 (FIG. 5). In these embodiments, download agent 80 may receive a list of the map information for each one of media assets 102 from media server 6 or delivery information server 82. The key frame for each one of media assets 102 may already be temporally proximate to one another. Additionally, media server 6 or delivery information server 82 may correlate the byte offsets within media assets 102 for temporally proximate key frames for media assets 102 that define the time when download agent 80 needs to switch from one of media assets 102 to the temporally next one of media assets 102.

Stream agent 88 interacts with source manager 92 to request data from specific portions of media assets 102 and blends data from the disparate streams of media assets 102 into a valid output stream 104 while performing any required transformations to the stream data. For example, source manager 88 may request particular segments of media assets 102 and extract the application-layer media data from each media asset for placement into a respective "container." Stream agent 88 may then interact with the appropriate software container of source manager 92 to retrieve the appropriate media data. Stream agent 88 may be preprogrammed to perform actions on specific media asset formats such as Flash Format (FLU) used by Adobe Flash Player, provided by Adobe Systems, Inc., Advanced System Format (ASF) used by Windows Media Player or Silverlight, provided by Microsoft Inc., or other media asset formats. Stream agent 88 may also ensure that download from each media asset 102 is forecasted based on conditions and that the resultant data stream are stitched together at temporally correlated key frames. In this manner, client 84 viewing media player 78 may be oblivious to the automated functions of download agent 80.

In some embodiments, download agent 80 may receive the media asset name and location. In these embodiments, stream agent 88 may cause source manager 92 to directly download the media asset. Also, in these embodiments, stream agent 88 may not check to see the metadata to determine where to download from, since media server 6 provided the desired file name and location.

In some embodiments, download agent 80 may receive the media asset name and location, as well as, the temporal location of the media asset where download agent 80 needs to start downloading from. In these embodiments, temporal metadata 96 may correlate the temporal location within the media asset to the point from where download agent 80 needs to download. Stream agent 88 may cause source manager 92 to download from the location determined by temporal metadata 96. In these embodiments, stream agent 88 may not check to see the metadata to determine where to download from, since media player 6 provided the desired file name and location, as well as, the temporal point to start downloading from.

In embodiments where media assets 102 contain similar content but with different visual quality requiring different playback rates, playback controller 86 provides high-level control logic to determine the what actions should take place based on various conditions, including environmental, buffered data in view of tolerances, actual bandwidth, utilization of computing resources of client device 10, bandwidth pricing, and the like. During this process, playback controller 86 may monitor playback status such as current playback timestamp or current playback frame rate of media player 78. Based on these inputs, playback controller 86 provides playback rate guidance to request stream agent 88 to select a media asset 102 that requires a higher or lower playback bit rate. For example, media player 78 may be displaying media asset 102A,D, playback controller 86 may determine that a media asset with a lower playback rate is necessary. Playback controller 86 may guide stream agent 88 to dynamically switch to media asset 102B,D.

In some embodiments, media assets 102 have been described as media assets with similar content but with different playback rates, and have been described as media assets with different data for certain time intervals or data ranges. These features of media assets 102 are merely exemplary. In some embodiments, in the context of video, media assets 102 may contain similar content and similar playback rates, however each one of media assets 102 may be optimized for a certain display resolution. In these embodiments download agent 80 may determine the display resolution from media player 78. The display resolution may be set based on factors such as the display resolution capabilities of the client device. The playback status may include the display resolution. If the playback status of media player 78 is not ideal, download agent 80 may dynamically select a higher resolution or lower resolution media asset from media assets 102 in techniques similar to the ones described above. In embodiments where the client device can only display a certain maximum resolution, download agent 80 may only select media assets 102 that are optimized for the maximum client device resolution or media assets 102 that have lower resolution than the maximum client device resolution, even if the playback status indicates that one of media assets 102 with higher resolution than the maximum client device resolution can be played.

In some embodiments, the media assets may have similar content and similar playback rates, however, the encoding scheme of media assets 102 may be different. In these embodiments, media server 6 includes additional sets of media assets that contain similar content and similar playback rates, but with different encoding schemes. For example, media server 6 stores media assets 102A,A,A-102N,N,N, where the first letter signifies the time interval of the live transmission, the second letter signifies the particular playback rate, and the third letter signifies the encoding scheme. Media assets 102 may be encoded with different encoding schemes. Each encoding scheme may require different amounts of computing resources on the client device. An encoding scheme that requires more computing resources than others may yield a higher quality media experience. Similarly, an encoding scheme that requires less computing resources than others may yield a lower quality media experience. Download agent 80 may dynamically select a different one of media assets 102 based on the computing resources of the client device. For example, in some embodiments the client device may have poor computing resources for a certain amount of time due to computing resources taken up by other programs running on the client device. Playback status may indicate duration of time when the computing resources are poor. In that time frame, download agent 80 may select one of media assets 102 that requires lower computing resources, and then dynamically select one of media assets 102 that requires more computing resources when computing resources on the client device are freed up. For example, one of media assets 102 may be encoded with the VP6 scheme. The VP6 scheme generally requires less computing resources, but the data quality may be poor. Another one of media assets 102 may be encoded with the H.264 scheme. The H.264 scheme generally requires more computing resources, but the data quality may be higher. One of media assets 102 encoded with the VP6 scheme may be played back at the same playback rate as one of media assets 102 encoded with the H.264 scheme. Download agent 80 may dynamically select between the media asset encoded with the VP6 scheme and the media asset encoded with the H.264 scheme based on the computing resources of the client device. The VP6 and H.264 schemes are merely exemplary; other encoding schemes may also be used. Download agent 80 may select between different media assets 102 with different encoding schemes in techniques similar to the ones described above.

In some embodiments, all media assets 102 may contain similar media content. However, some media assets 102 may have different playback rates, some media assets 102 may be optimized for a certain resolution, and some media assets 102 may be encoded differently. In this embodiment, download agent 80 may dynamically select between media assets 102 by taking into account the playback rate, resolution, and encoding scheme to select the optimal file from media assets 102 in techniques similar techniques to the ones described above. In these embodiments, media server 6 stores media assets 102 from media asset 102A,A,A-102N,N,N,N. Each letter signifies a different attribute of the media assets 102.

In one example implementation, playback controller 86 may include a bit rate selection module (BRSM) 90 that maintains a data delivery policy storage module (DDPS) 94. Although illustrated as located within client device 10, BRSM 90 and DDPS 94 may be located remote from the client device, such as within media server 6 or delivery information server 20. BRSM 90 aids playback controller 86 in the selection of the version of the media asset from the available versions of the media asset, i.e., the different media assets 102 in the example of FIG. 9. Data delivery policy storage 94 may store a wide variety of data delivery policies that serve a wide variety of business purposes.

In one example, a network service provider may charge higher rates for bandwidth utilization during certain peak hours of day when overall network bandwidth utilization is higher. Bandwidth utilization refers to the amount of bits transferred per second. Bandwidth utilization should not be confused with transfer rates. A transfer rate describes the speed at which data is transferred. Bandwidth utilization describes the amount of bits that are transferred. For instance, overall network bandwidth utilization may be highest between 4:00 PM and 7:00 PM. In this example, delivery information server 82 may store a data delivery policy that indicates that media server 6 wishes a lower desired overall bandwidth utilization during the peak hours and that indicates a relatively higher desired bandwidth utilization during off-peak hours. BRSM 90 may select versions of media assets having lower playback rates during peak hours and may select versions of media assets having higher playback rates during off-peak hours.

FIG. 10A is a flow chart illustrating an example operation of client device 10 in embodiments where the client device is receiving media assets in a consecutive time intervals of the live transmission. Client device 10 transmits a request to media server 6 or delivery information server 82 for a media asset that corresponds to the now point of the live transmission (104). In some embodiments, media server 6 determines the required backset, as described above (106). Alternatively, in some embodiments, media server 6 determines the recommended backset, as described above, for the particular client and transmits to client device 10 the recommended backset (106). In some embodiments, backset calculator 91 may accept the recommended backset, or alternatively, calculate a new backset. Media server 6 or delivery information server 9 may provide client 10 with a list of URLs for the media assets. Client device 10 via stream agent 88 checks the metadata of the media assets or the map information for the media assets to determine which media asset needs to be downloaded based on the calculated backset (108). Download agent correlates the timestamps for key frames for the different sets of media files 102 to byte offsets in the various media file formats and stores the results within temporal metadata 96. For example, temporal metadata 96 correlates the timestamps for key frames for media assets 102A,A-102A,N, 102B,A-102B,N, and so on until it reaches the most current media assets. In some embodiments, client device 10 may also check the name of the media asset to determine which media asset to download. As described above, the media asset name may be some predictable naming scheme that describes the temporal order of the media assets. Download agent 80 may request for a particular media asset based on its name. Alternatively, download agent 80 may request for a particular media asset for a time interval by specifying, for example,

```
GET /media/video_clip1.flv HTTP/1.0
Range: time interval=0-5 minutes
```

It is worth noting, that client 84 is oblivious to the fact that he or she has been backset a certain amount. Client 84 may believe that he or she is viewing the now point of the live transmission, but in fact he or she is actually viewing what happened a few seconds prior to the now point. Additionally, media player 78 is also oblivious to the fact that client 84 has been backset.

After determining the correct one of media assets 102 to download, source manager 92 may begin downloading the particular media asset (110). After downloading the particular media asset, client 10 may present the media content of the media asset via media player 78 (112). Client 10 may then determine which file to download next. As above, client 10 may determine which file to download next based on the metadata, map information, or media asset name. As described above, download agent 80 may request for a particular media asset for a time interval by specifying, for example,

```
GET /media/video_clip2.flv HTTP/1.0
Range: time interval=5-10 minutes
```

As described above, in some embodiments client device 10 may disregard the backset transmitted by media server 6 and instead may calculate a new backset based on the recommended backset transmitted by media server 6. In some embodiments, client device 10 may receive coefficients from media server 6 to aide in calculating the new backset. In such embodiments, after calculating a new backset based on a distribution function and coefficients, client device 10 may request for media assets that corresponds to the particular backset in techniques similar to those described above.

FIG. 10B is a flow chart illustrating an example operation of client device 10 in embodiments where client device 10 is switching between media assets with similar data content but different versions. Initially, media player 78 receives a request from client 84 to present a media asset (114). When media player 78 receives the request to present the media asset, download agent 80 outputs a request to delivery information server 82 for information related to different playback rate representations of the media asset (116). Subsequently, client device 10 may receive a message from delivery information server 82 that identifies the various media assets 102 for each set of media assets 102 that represent the different playback rate representations (118). For example, delivery information 82 identifies media assets 102C,A, 102C,B, and 102C,C. Download agent 80 may receive a message (e.g., in the form of a web page) from delivery information server 82 that includes a set of URLs to the different a playback rate representation of the media asset, i.e., media files 102C,A, 102C,B, and 102C,C.

Next, download agent 80 accesses all of the respective media files 102 having different playback rates, e.g. 102C,A, 102C,B, and 102C,C, representations of the media asset and downloads metadata contained within a first segment of each of the media files (120). For example, the download agent 80 retrieves the first segment of data from each of the media assets 102 and extracts the metadata, including the key frame list that indicates byte indexes, e.g., datastamps, and timestamps associated with key frames for the respective media file. Download agent correlates the timestamps for key frames for the different media files 102, e.g. 102C,A, 102C,B, and 102C,C, to byte offsets in the various media file formats and stores the results within temporal metadata 96.

As one example, in an exemplary implementation in which client device 10 uses HTTP to request and receive data of the media object, client device 4 may, for example, output a set of initial HTTP requests that each includes, in a header of the HTTP request, a resource identifier associated with all data in the media object and a range element that specifies the first segment containing the metadata. In this example, the range element may specify the first range by specifying a byte index of a first byte and a byte index the last byte of the range. For instance, each of the initial HTTP requests may specify the resource identifier "/media/video_clip.flv" and the range element may specify the first range by specifying that the first range starts at byte 0 of the media object and ends at byte 100 of the media object. In this instance, an example initial HTTP request may appear in part as:

```
GET /media/video_clip.flv HTTP/1.0
Range: bytes=0-100
```

Next, download agent 80 selects one of the playback rate representations (i.e., one of media files 102, e.g. 102D,A) based on various conditions and/or user input, and outputs a request to receive additional data from the media asset corresponding to the selected playback rate (122). For example, download agent 80 may generate an HTTP request that specifies the resource identifier associated with the selected media file 102 and specifies a second range of data within the media object. For example, client device 10 may output a second HTTP request that includes, in a header of the second HTTP request, the resource identifier associated with all data in the media object and a range element that specifies the second range. In this example, the range element may specify a second range by specifying a byte index of a first byte of the second range and a byte index of the last byte of the second range. For instance, the second HTTP request may specify the resource identifier "/media/video_clip.flv" and the range element may specify the second range by specifying that the second range starts at byte 200 of the media object and ends at byte 1000 of the media file. In this instance, the second HTTP request may appear as:

```
GET /media/video_clip.flv HTTP/1.0
Range: bytes=200-1000
```

After download agent 80 generates the request for the version of the media asset that has the indicated playback rate, download agent 80 output the request to media server 6 via network 8 (122). Subsequently, network interface 70 receives data via network 8 for the media file 102 that has the appropriate playback rate representation (124).

As network interface 70 receives data in the version of the media asset, source manager 92 makes the data available to stream agent 88, which retrieves the encoded media data and provides it so media player 78 via TCP connection 98 (126). Media player 78 decodes the media data of the media asset and presents the media to client 84 (128).

During this process, playback controller 86 monitors playback status including the current playback timestamp of the media and/or the current playback frame rate of media player 78. In addition, playback controller 86 monitors various conditions, including an amount of buffered data that has been downloaded and yet to be consumed by media player 78 in view of defined tolerances, an actual bandwidth achieved by the download, a utilization of computing resources of client device 10, bandwidth utilization pricing for the current download, and the like. Based on these inputs, playback controller 86 invokes BRSM to determine whether a dynamic transition to a different playback rate representation is in order. If so, playback controller 86 outputs a playback rate guidance message to request stream agent 88 to select a higher or lower playback rate media asset 102 (130).

Figure 11:
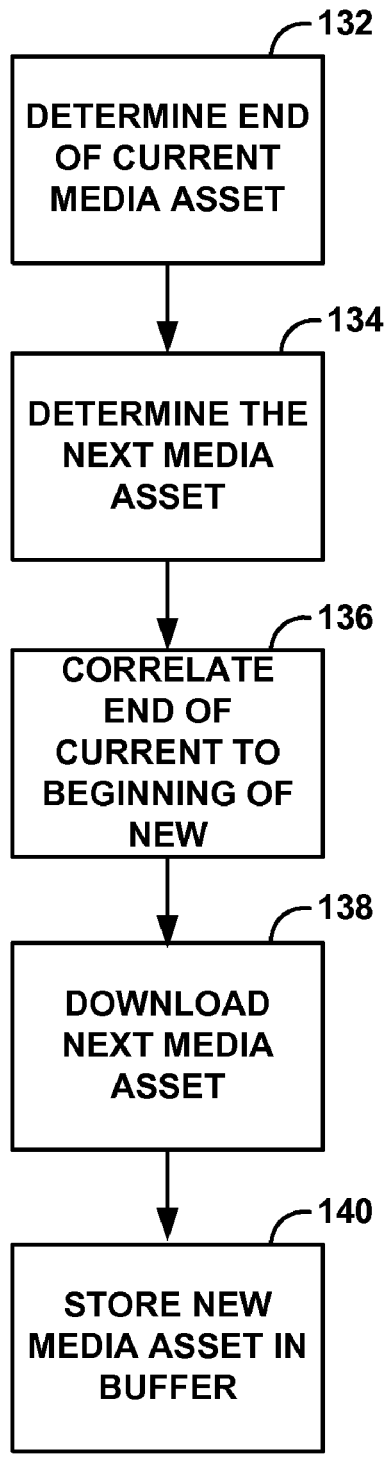
FIG. 11 is a flow chart illustrating an example operation of download agent switching between media assets from media server.

FIG. 11 is a flow chart illustrating an example operation of download agent 80 switching between media assets 102 from media server 6. Stream agent 88 controls the flow of media data to media player 78 such that data is generally delivered as needed by the media player without substantial data buffering by the media player. In other words, source manager 92 provides internal data buffering and stream agent 88 extracts and provides the data to media player 78 at a rate generally equal to the playback rate at which the media is to be consumed and presented to the user. Temporal metadata 96 may determine the temporal end or data range end of the current media asset being displayed by media player 78 (132). As described above, temporal metadata 96 may use the metadata of the current media asset being played to determine the end of the current media asset. Stream agent 88 may determine which media needs to be downloaded after the current media asset (134). For example, in one embodiment, stream agent 88 determines which media needs to be downloaded after the current media asset based on the predicted naming scheme described above. In another example embodiment, stream agent 88 analyzes the key frame list of the metadata to look forward with respect to the playback time and identifies an upcoming key frame. Stream agent 88 may check the map information downloaded by source manager 92 to determine which media asset needs to be downloaded next. Stream agent 88 may also check the media asset names, to determine which media asset needs to be downloaded next. Temporal metadata 96 may be used to correlate any byte offsets between the current media asset and the next media asset that is to be played (136). For example, if the current media asset is 102A,D, and the next media asset to be played is 102C,D, temporal metadata 96 correlates any byte offsets between 102A,D and 102C,D. Stream agent then determines a byte offset for the key frame for the media file for the newly selected media asset and outputs a request to direct source manager 92 to retrieve the media asset that includes the identified key frame. Stream agent 88 may then download the next media asset (138). The downloaded media asset may be stored in the buffer for download agent 10 (140). In one example, playback controller 86 monitors the amount of buffered data, i.e., any media file frames temporarily stored before being presented to media player 78 for display. Stream agent 88 then continues to deliver the buffered media data (i.e., data for the current playback rate representation) to media player until the identified, upcoming key frame is reached. At this point, stream agent retrieves and extracts media data from source manager 92 for the media asset, and seamlessly delivers the media data to the media player 78 by TCP connection 98. In this way, download agent 80 seamlessly splices the different playback rates of the media asset onto TCP connection 98 so that media player 78 is unaware of any dynamic playback rate switches selected by download agent 80.

After successfully splicing the media data from the newly selected media asset on the TCP connection, stream agent 88 may direct source manager to close the previous TCP connection used to retrieve media data from the media asset that has just been downloaded.

Figure 12:
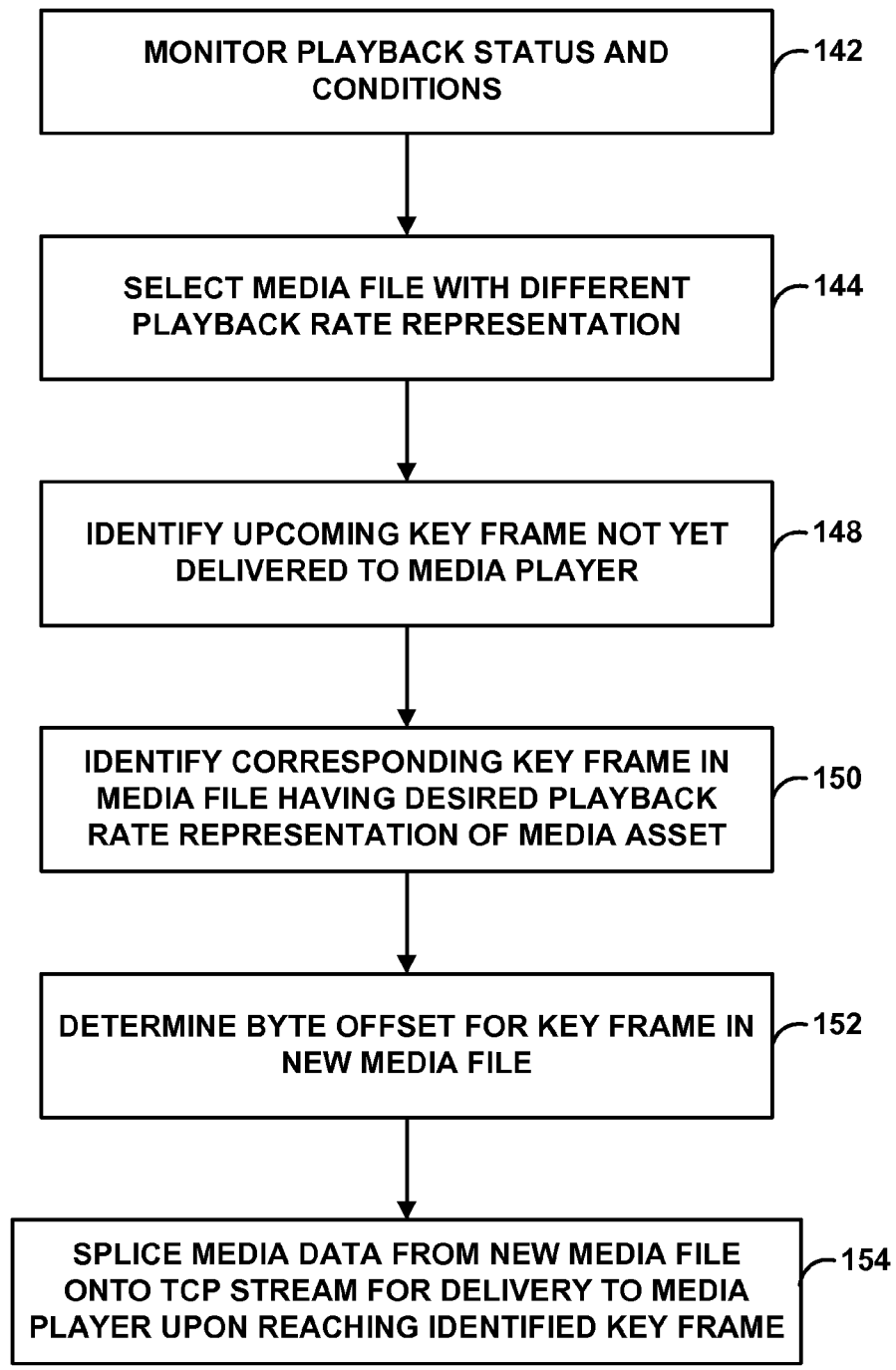
FIG. 12 is a flow chart illustrating an example operation of download agent when dynamically transitioning between different media assets in embodiments where media assets contain similar data but different playback rates.

FIG. 12 is a flow chart illustrating an example operation of download agent 80 when dynamically transitioning between different media assets in embodiments where media assets 102 contain similar content but have different playback rates. Stream agent 88 controls the flow of media data to media player 78 such that data is generally delivered as need by the media player without substantial data buffering by the media player. In other words, source manager 92 provides internal data buffering and stream agent 88 extracts and provides the data to media player 78 at a rate generally equal to the playback rate at which the media is to be consumed and presented to the user. During this process, playback controller 86 closely monitors the playback status of media player 78, especially in embodiments where media assets 102 contain the same content, but different visual playback specifications (142). The playback status includes the current playback timestamp or current playback frame rate so as to reflect a current position of the media player 78 with respect to playback of the current media asset. In addition, playback controller 86 monitors an amount of data that has been downloaded and buffered and yet to be consumed by media player 78 in view of defined tolerances, an actual bandwidth achieved by the download, a utilization of computing resources of client device 10, bandwidth utilization pricing for the current download, and the like.

Based on these inputs, playback controller 86 provides playback rate guidance to request stream agent 88 to select a higher or lower playback rate media file 102, e.g. 102A,A or 102A,B, as necessary (144). In one example, playback controller 86 monitors the amount of buffered data, i.e., any media file frames temporarily stored before being presented to media player 78 for display. The buffer size may be measured as a unit of time or as a unit of bits.

As another example, if the amount of buffered data consistently exceeds a desired threshold amount, playback controller 86 may determine that the actual throughput rate exceeds the playback rate and may cause stream agent 88 to select a different media file that having a higher-quality playback rate representation of the media.

In any event, in response to an instruction to dynamically transition to a new playback rate, stream agent 88 accesses temporal metadata 96 and identifies a temporal location for an upcoming key frame of the current playback rate representation that has not yet been delivered to media player 78 (146). For example, stream agent 88 analyzes the key frame list of the metadata to look forward with respect to the playback time and identifies an upcoming key frame.

Stream agent 88 then analyzes the temporal metadata 96 to identify a corresponding key frame in the other media file 102 for the playback rate to which download agent is transitioning (i.e., a key frame of the targeted media file that has the same timestamp as the identified upcoming key frame in the current playback rate representation) (148). Stream agent 88 then determines a byte offset for the key frame for the media file for the newly selected playback rate and outputs a request to direct source manager 92 to retrieve a data segment that includes the identified key frame.

Stream agent 88 then continues to deliver the buffered media data (i.e., data for the current playback rate representation) to media player until the identified, upcoming key frame is reached. At this point, stream agent retrieves and extracts media data from source manager 92 for the new playback rate, and seamlessly delivers the media data to the media player 78 by the same TCP connection 98 (152). In this way, download agent 80 seamlessly splices the different playback rates of the media asset onto TCP connection 98 so that media player 78 is unaware of any dynamic playback rate switches selected by download agent 80.

In another embodiment, download agent 80 may select a different one of media files 102 at a timestamp of a difference frame in the file currently being played. A difference frame may be a frame that is encoded with the aid of one or more frames. Some examples of difference frames are predictive frames or bi-directional frames. The timestamp of the difference frame in the file currently being played may be temporally proximate to a timestamp of a key frame in the selected media file. The key frame in the selected media file may not be the first frame of the selected media file. In this embodiment, download agent 80 may receive a list of timestamps for certain difference frames from delivery information server 82 or media server 6. Download agent 80 may also generate a list of timestamps for difference frames in similar techniques as the ones described above. Download agent 80 may dynamically select between different media files 102 at difference frames in techniques similar to the ones described above.

Figure 13:
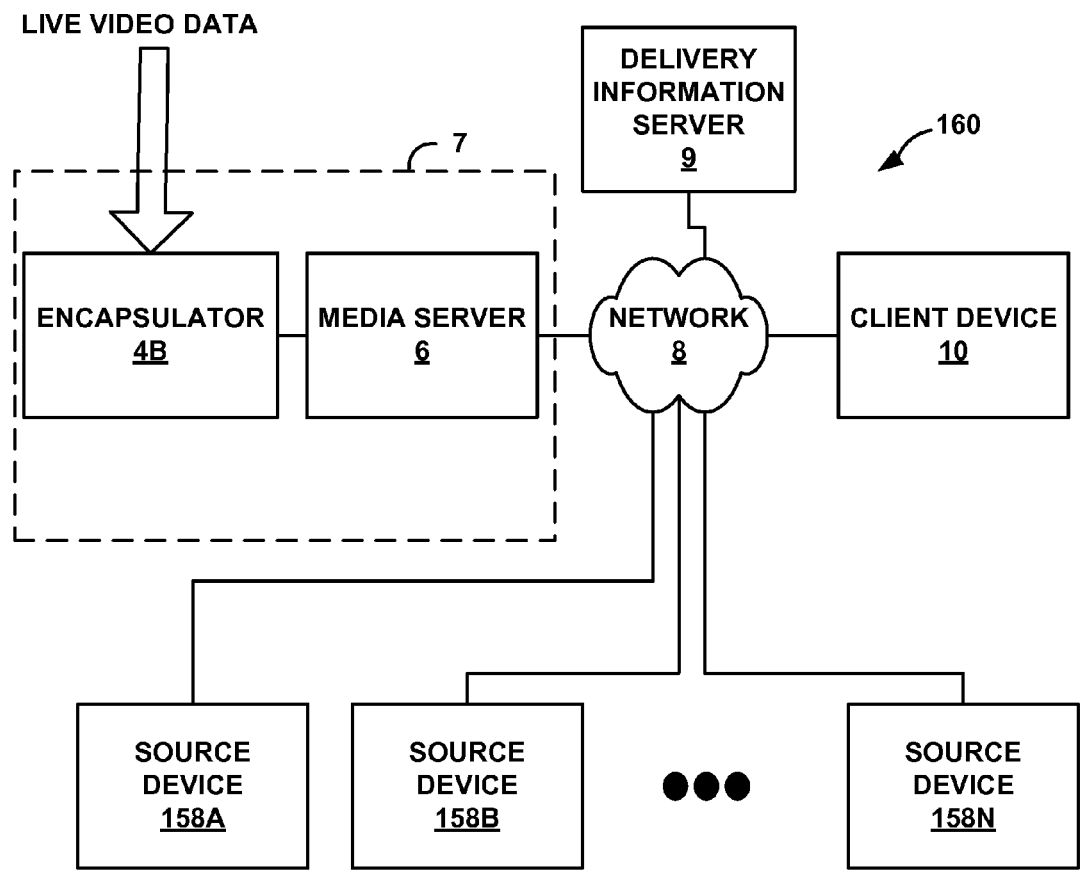
FIG. 13 is a block diagram illustrating an exemplary system for downloading a live transmission with swarming.

FIG. 13 is another block diagram illustrating an exemplary system 160 for downloading a live transmission. System 160 may be substantially similar to system 2 (FIG. 1). However, system 160 includes source device 158A-158N (herein referred to as source devices 158) that generally represent peer devices in the form of client devices that have already downloaded media assets for the live event or intermediate servers that are seeded with the media assets as they are formed by encapsulator 4B.

In the example embodiment of FIG. 13, client device 10 may be able to download media assets from media server 6, source devices 158, or media server 6 and source devices 158 in parallel. The ability to download from media server 6 and source devices 158 is referred to as swarming.

In the exemplary embodiment of FIG. 13, when client device 10 requests for a media asset via delivery information server 82, media server 6 and client device 10 may perform similar functions as those described above. In addition, however, delivery information server 82 may direct the requesting client 10 to request one or more media assets (or specific byte ranges within the media assets) from peer source devices 158 based on the particular backset allocated to the requesting client device. Accordingly, client device 10 may be able to download media assets not only from media server 6, but from source devices 158 as well, and such transfer may incur in parallel so as to reconstitute media assets on client 10 for presentment to the user as a live video event. For example, client device 10 may wish to download mediafile10 from media server 6. However, source device 158A already downloaded mediafile10.

According to the exemplary embodiment of FIG. 13, source manager 92 may receive the location such as a URL for a media asset from delivery information server 82. In addition, source manager 92 may also receive the location for successive media assets that have already been downloaded by at least one of source devices 158. Playback controller 86 may check the amount of data in the buffer. Playback controller 86 may transmit the buffer status to stream agent 88. If the buffer data is low, stream agent 88 may cause source manager 92 to download media asset from media server 6, and in parallel to download successive media assets, i.e. media assets that are temporally after the current media asset. Stream agent 88 may then store the successive media assets in the buffer. In this manner, the buffer within client device 10 is build with additional media assets while client device 10 is downloading the current media asset. In this manner, the buffer of client device 10 will never get too low since there will always be data being downloaded in parallel. Since the buffer will always have plenty of media asset data stored, the chance that client 84 may have to pause for rebuffering drops dramatically.

Additionally, swarming provides failure protection against transmission failures from media server 6. If there is a transmission failure from media server 6, client device 10 can download media assets from source devices 158 while the transmission failure from media server 6 is resolved. Client device 10 can download media assets from source devices 158 based on the map of timestamps, the map of datastamps, and/or the predictable naming scheme. For example, in a possible situation, media server 6 malfunctions and is not capable of providing media assets to client device 10. In such situations, client device 10 can download media assets from source devices 158 while the malfunction of media server 6 is resolved. As a further example, assume client device 10 just finished downloading mediafile15 when media server 6 malfunctioned. In one embodiment, based on the predictable naming scheme client device 10 knows that the next media asset it needs to download is mediafile16. Client device 10 may download mediafile16 from source device 158A, assuming source device 158A had previously downloaded mediafile16. In this example, client device 10 is backset further than source device 158A.

Additionally, in some embodiments, media asset builder 16 (FIG. 2) may generate media assets of different sizes. For example, media asset builder 16 may generate smaller sized media assets, e.g. 5 mega-byte files, at the beginning of the live event, and larger sized media assets, e.g. 30 mega-byte files, near the end of the live event. Generating different sized media assets may provide advantages, especially in the swarming context. For example, assume the live event is a concert. Logically, most viewers will want to join in the first few hours of the concert. Each viewer may have different delays. At the beginning, a viewer who is delayed more than other viewers may be able to swarm the beginning of the concert from multiple other viewers because each file is small and therefore contains less time of the concert. Logically, most viewers will not want to join after a few hours of the concert. Media asset builder 16 may generate larger files after a few hours of the concert because most every viewer has already filled their respective buffers by swarming and is now only downloading from media server 6.

The various embodiments described above may provide client 84 with more options than the traditional solution. For example, client 84 may be able to fast-forward the live event. Since client device 10 is continuously downloading media assets from media sever 6 or in parallel from source devices 152, client 84 may be able to fast-forward especially when the buffer contains a lot of media assets. In such embodiments, playback controller 86 may determine whether client 84 can fast-forward based on the size of the buffer. If client 84 does fast-forward, stream agent 88 may jump from key frame to key frame within a media asset. As described above, the metadata for a media asset, or map information may include temporal locations or data range locations of key frames within a media asset. The metadata for the media asset, or map information may be stored in temporal metadata 96. Stream agent 88 may jump to the key frames within a media asset, and cause media player 78 to jump to the various key frames via TCP connection 90. Similarly, client 84 may be able to rewind the live transmission. Additionally, because every portion of time is individually addressable, client 84 may be able to start the live transmission at some arbitrary location.

The code may be executed by one or more processors, such as one or more digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various embodiments of the invention have been described. These and other embodiments are within the scope of the following claims.

The invention claimed is:

1. A method for a media server to deliver a live transmission, comprising:
   receiving a request from a plurality of client devices to download the live transmission via a packet-based computer-network;
   determining an amount of backset for each one of the plurality of client devices upon receiving the request, wherein at least two client devices of the plurality of client devices are determined to have different amounts of backset, wherein the determined amount of backset is calculated based on a plurality of coefficient values and a distribution function that is weighted such that in a majority of situations the amount of backset equals the recommended backset, in a minority of situations the amount of backset is less than the recommended backset, and in a minority of situations the amount of backset is greater than a recommended backset and less than a maximum backset; and
   providing the plurality of client devices at least one media asset stored by the media server based on the determined amount of backset, wherein the at least one media asset comprises data of the live transmission for a time interval or data range.

2. The method of claim 1, wherein providing the plurality of client devices at least one media asset comprises: providing a first media asset to each one of the plurality of client devices; and providing a second media asset to each one of the plurality of client devices, wherein the second media asset includes data of the live transmission for a time interval or data range that follows the first media asset.

3. The method of claim 1, wherein providing the plurality of client devices at least one media asset comprises providing a first media asset to a first client device and providing a second media asset to a second client device, wherein the determined amount of backset for the first client device is different than the determined amount of backset for the second client device, wherein the first media asset is different than the second media asset, and wherein the first media asset and the second media asset include data of the live transmission.

4. The method of claim 1, wherein providing the plurality of client devices at least one media asset comprises providing a first portion of the at least one media asset to a first client and providing a second portion of the at least one media asset to a second client, wherein the determined amount of backset for the first client device is different than the determined amount of backset for the second client, wherein the first portion of the at least one media asset is different than the second portion of the at least one media asset, and wherein the at least one media asset includes data of the live transmission.

5. The method of claim 1, wherein determining the amount of backset for each one of the plurality of client devices comprises determining the amount of backset for each one of the plurality of client devices based on at least one of a number of client devices currently downloading the live transmission, a geographical proximity of client devices currently downloading the live transmission, an actual throughput rate to each one of the plurality of client devices, or a historical actual throughput rate to each one of the plurality of client devices.

6. The method of claim 1, wherein determining the amount of backset for the plurality of client devices comprises: transmitting a the maximum backset to each of the plurality of client devices; and receiving a request for at least one media asset from each one of the plurality of client devices, wherein the requested media asset corresponds to a backset that is less than the maximum backset.

7. The method of claim 1, wherein providing at least one media asset comprises at least one of transmitting a media asset based on the amount of backset, and transmitting a portion within a media asset based on the amount of backset.

8. The method of claim 1, wherein providing at least one media asset comprises: providing a plurality of media assets to each one of the plurality of client devices; and providing at least one of a map of timestamps or a map of data stamps to each one of the plurality of client devices, wherein the map of timestamps comprises a timestamp for each key frame within a media asset that corresponds to a length of time of the live transmission, and wherein the map of data stamps comprises a data stamp for each key frame within the media asset that corresponds to an amount of data of the live transmission.

9. The method of claim 1, wherein the amount of backset is an amount of time that is temporally prior to the request from the plurality of client devices to download the live transmission.

10. The method of claim 1, wherein the at least one media asset is individually storeable, retrievable, and addressable, and wherein the at least one media asset is addressable using a predictable name.

11. A method for a client device to receive a live transmission, the method comprising:
  transmitting a request to a media server to download the live transmission;
  receiving a backset from the media server requesting a media asset of the live transmission based on the received backset, wherein the media asset comprises data of the live transmission for a time interval or data range; and downloading the media asset, wherein the backset is calculated based on a plurality of coefficient values and a distribution function that is weighted such that in a majority of situations the amount of backset equals the recommended backset, in a minority of situations the amount of backset is less than the recommended backset, and in a minority of situations the amount of backset is greater than a recommended backset and less than a maximum backset.

12. The method of claim 11, further comprising: receiving at least one of a map of time stamps or a map of data stamps, wherein the map of timestamps comprises a timestamp for each key frame within the media asset that corresponds to a length of time of the live transmission, and wherein the map of data stamps comprises a data stamp for each key frame within the media asset that corresponds to an amount of data of the live transmission.

13. A media content provider to deliver a live transmission, the media content provider comprising:
  an encapsulator that includes an interface to receive the live transmission and provide the live transmission to a media asset builder that generates a plurality of media assets; and
  a media server that stores each one of the plurality of media assets, provides the media assets to a plurality of client devices, and determines an amount of backset for each one of the plurality of client devices, wherein at least two client devices of the plurality of client devices have different amounts of backset, wherein the determined amount of backset is calculated based on a plurality of coefficient values and a distribution function that is weighted such that in a majority of situations the amount of backset equals the recommended backset, in a minority of situations the amount of backset is less than the recommended backset, and in a minority of situations the amount of backset is greater than a recommended backset and less than a maximum backset.

14. The media content provider of claim 13, wherein the media server provides a first media asset to a first client device of the plurality of client devices and provides a second media asset to a second client device of the plurality of client devices, wherein the determined amount of backset for the first client device is different than the determined amount of backset for the second client device, wherein the first media asset is different than the second media asset, and wherein the first media asset and second media asset include data of the live transmission.

15. The media content provider of claim 13, wherein the media server provides a first portion of the at least one media asset to a first client device of the plurality of client devices and provides a second portion of the at least one media asset to a second client device of the plurality of client devices, wherein the determined amount of backset for the first client device is different than the determined amount of backset for the second client, wherein the first portion of the at least one media asset is different than the second portion of the at least one media asset, and where the at least one media asset includes data of the live transmission.

16. The media content provider of claim 13, wherein the media server determines the amount of backset for each of the plurality of client devices based on at least one of a number of client devices currently downloading the live transmission, a geographical proximity of client devices currently downloading the live transmission, an actual throughput rate to each one of the plurality of client devices, or a historical actual throughput rate to each one of the plurality of client devices.

17. The media content provider of claim 13, wherein the media server provides at least one media asset by transmitting a media asset based on the amount of backset, or provides at least one media asset by transmitting a portion within a media asset based on the amount of backset.

18. The media content provider of claim 13, wherein the media server provides at least one media asset by providing a plurality of media assets to each one of the plurality of client devices, and providing at least one of a map of time stamps or a map of data stamps to each one of the plurality of client devices, wherein the map of time stamps comprises a timestamp for each key flame within a media asset that corresponds to a length of time of the live transmission, and wherein the map of data stamps comprises a data stamp for each key flame within the media asset that corresponds to an amount of data of the live transmission.

19. The media content provider of claim 13, wherein the amount of backset is an amount of time that is temporally prior to the request from the plurality of client devices to download the live transmission.

20. The media content provider of claim 13, wherein the map of data stamps is individually storable, retrievable, and addressable, and wherein the at least one media asset is addressable using a predictable name.

21. A client device to receive a live transmission, the client device comprising:
  a media player; and
  a download agent comprising a playback controller, a source agent, and a stream agent, wherein the source agent transmits a request to a media server to download the live transmission, and receives a backset from the media server, wherein the source agent requests a media asset based on the received backset and causes the stream agent to the download the requested media asset, and wherein the media asset comprises data of the live transmission for a time interval or data range, wherein the backset is calculated based on a plurality of coefficient values and a distribution function that is weighted such that in a majority of situations the amount of backset equals the recommended backset, in a minority of situations the amount of backset is less than the recommended backset, and in a minority of situations the amount of backset is greater than a recommended backset and less than a maximum backset.

22. The client device of claim 21, wherein the source manager sequentially requests media assets that follow one another.

23. The client device of claim 21, wherein the source agent requests a media asset comprises the source agent accessing metadata stored within the plurality of media assets to find a media asset comprising data that corresponds to the backset.

24. The client device of claim 21, wherein the media asset is individually storable, retrievable, and addressable, and wherein the media asset is addressable using a predictable name.

25. The client device of claim 21, wherein the stream agent receives at least one of a map of timestamps or a map of data stamps, wherein the map of timestamps comprises a timestamp for each key frame within the media asset that corresponds to a length of time of the live transmission, and wherein the map of data stamps comprises a data stamp for each key frame within the media asset that corresponds to an amount of data of the live transmission.

* * * * *